(12) United States Patent
Minovitch

(10) Patent No.: US 6,193,194 B1
(45) Date of Patent: Feb. 27, 2001

(54) MAGNETIC PROPULSION SYSTEM AND OPERATING METHOD

(76) Inventor: Michael A. Minovitch, 2832 St. George St. Apt. 6, Los Angeles, CA (US) 90027

(*) Notice: Subject to any disclaimer, the term of this patent is extended or adjusted under 35 U.S.C. 154(b) by 0 days.

(21) Appl. No.: 09/146,927

(22) Filed: Sep. 1, 1998

(51) Int. Cl.$^7$ .................................................... B64G 1/40
(52) U.S. Cl. ........................ 244/172; 244/53 R; 244/62; 244/1 R; 60/202
(58) Field of Search .................................. 244/1 R, 12.2, 244/23 C, 34 A, 62, 53 R, 166, 172; 60/202, 721

(56) References Cited

U.S. PATENT DOCUMENTS

| | | | |
|---|---|---|---|
| 3,114,517 | * 12/1963 | Brown | 244/1 R |
| 3,891,160 | * 6/1975 | Minovitch | 244/1 R |
| 4,006,597 | * 2/1977 | Dick | 60/721 |
| 5,052,638 | * 10/1991 | Minovitch | 244/53 R |
| 5,520,356 | * 5/1996 | Ensley | 244/62 |

* cited by examiner

Primary Examiner—Peter M. Poon
Assistant Examiner—Yvonne R. Abbott

(74) Attorney, Agent, or Firm—Christie, Parker & Hale, LLP

(57) ABSTRACT

A traveling-field, magnetic propulsion system and operating method is provided for achieving economical space travel. The system is based upon designing the vehicle in the form of a single-stage streamlined circular toroidal airfoil containing a thin-walled superconducting solenoid. It is initially launched vertically off the earth's surface into a vacuum environment at 125 km using conventional rocket propulsion. It is then accelerated along a high-inclination trajectory by a traveling repulsive magnetic field generated by ejecting an easily ionizable low-density gas cloud in the vehicle's magnetic field and transmitting a high-power, plane-polarized, microwave beam at the cloud tuned to the electron cyclotron resonant frequency. The transmitter is constructed horizontally on the earth's surface as an electronically-steered, phased array several hundred meters in diameter energized by a large superconducting energy storage system. The transmitter will be able to transmit a converging CW microwave beam at the vehicle with very high power to magnetically accelerate it over great distances without atmospheric breakdown. The method can be used as a general high-speed earth or space transportation system by catapulting suborbital or orbital payloads, or by catapulting multi-kiloton payloads to other celestial bodies with mass ratios below that of long-range aircraft.

21 Claims, 3 Drawing Sheets

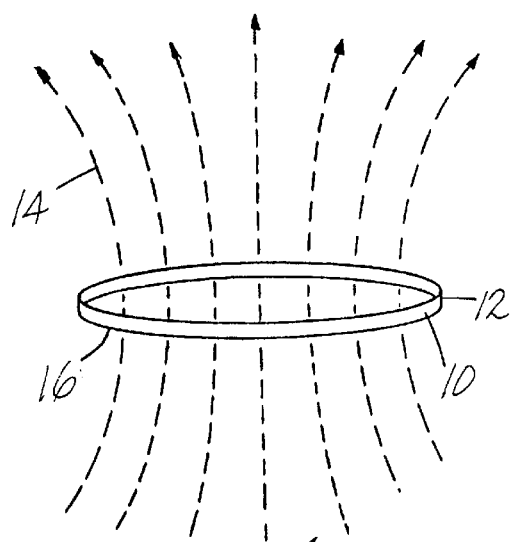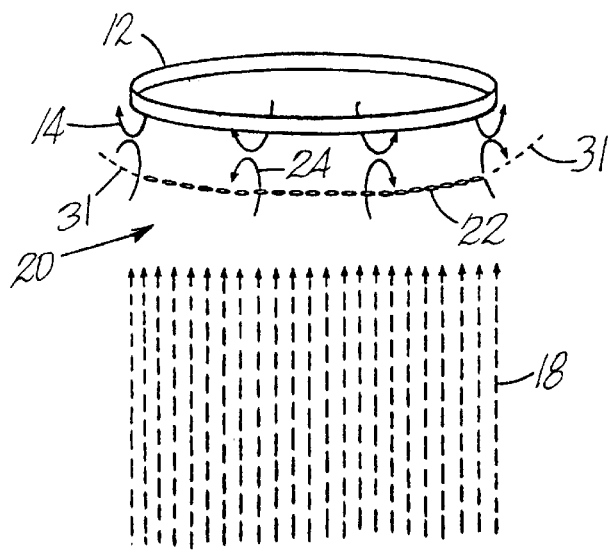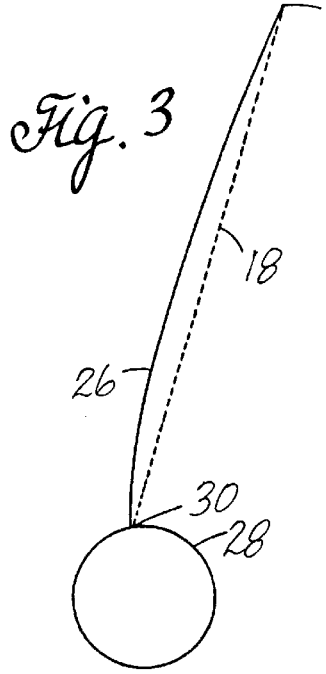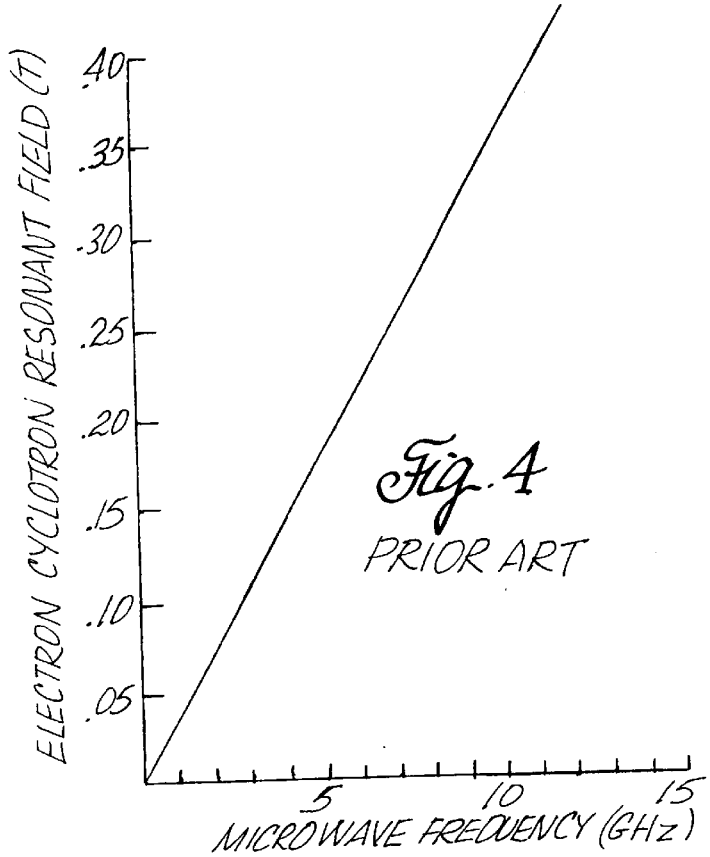

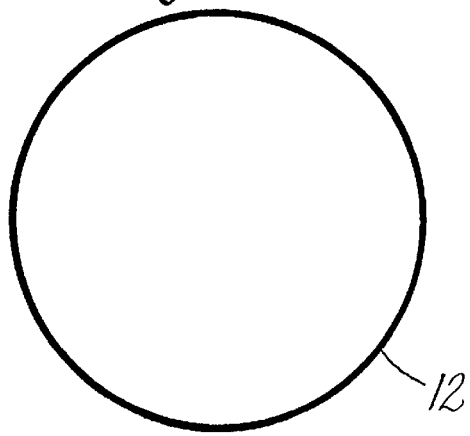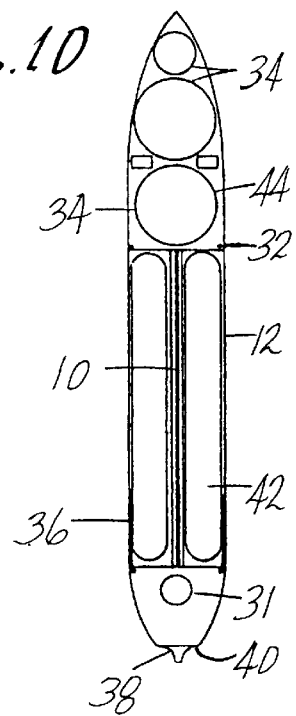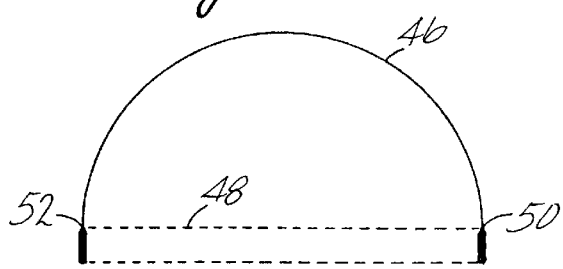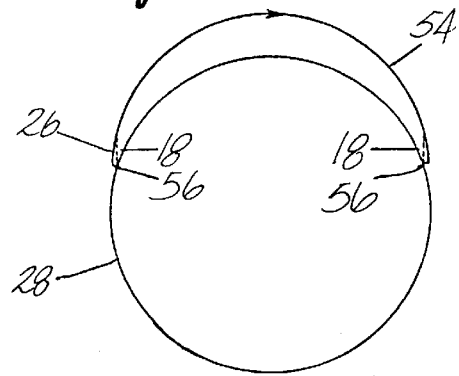

MAGNETIC PROPULSION SYSTEM AND OPERATING METHOD

BACKGROUND

At the present time the most economic, technically viable method used for launching and accelerating high-mass space vehicles from the earth's surface to orbital or escape velocities is based upon rocket or jet propulsion wherein propulsive thrust is achieved by burning a gas inside pressure chambers and creating pressure differentials on the walls by expelling the gas through a system of nozzles. Unfortunately, since the required velocities are relatively high, most of the chemical energy is wasted accelerating large amounts of unburned fuel, and the inert structural mass required to contain it. Thus, the useful payload is a small fraction of the vehicle's initial launch mass. This has serious technical implications in terms of payload limitations which appear to be unavoidable.

The minimum mass ratio (launch mass/burn-out mass) for achieving low earth orbit using $LH_2/LO_2$ propellant is about 10.0. Unfortunately, since the density of $LH_2$ is very low, the vehicle must be designed with a large structural mass to contain it. Consequently, the required initial mass will be very high, even for relatively small payloads. Thus, the cost to put payloads into orbit is very-high even if the vehicle is reusable. For example, the expected minimum cost of transporting payloads into orbit by the proposed reusable single-stage Aerospace Plane propelled by idealized scramjets operating at maximum efficiency or by the vertically launched Delta Clipper will be about $300/kg ($136/lb), and the size and weight of the payloads will be relatively small.

The problem of achieving economical space travel does not involve energy. A long-range 747 airliner burns the equivalent of twice its own orbital energy in the fuel it consumes. The problem is the high mass ratio of the launch vehicle set by the rocket equation. Therefore, if the underlying propulsion principles (i.e., the technical methods) of space travel remain unchanged, space travel will always remain very expensive and way beyond the reach of ordinary citizens. The situation can not be significantly improved by utilizing remotely generated laser or microwave beams to heat the propellant gas because of thermal and structural limitations. Although nuclear propelled vehicles could achieve high velocities in interplanetary space, they could not be operated directly from the earth's surface. The basic mass ratio problem of launching payloads from the earth's surface into orbit would still remain.

The technical problem of achieving economical space travel is one of the most challenging problems in applied physics. In actually, the problem is not actively pursued because it is viewed as having no viable solution that is attainable with current technology. The propulsion method and operating system introduced herein will provide a solution to this problem. What is most significant is that this method is well within technological feasibility, and, from an engineering point of view, will be relatively easy to develop and implement. It could also be utilized as a propulsion method for achieving low-cost high-speed intercontinental transportation at speeds far beyond that of supersonic airliners.

BRIEF DESCRIPTION OF THE INVENTION

In the vehicle acceleration method presented herein, the entire vehicle is designed with a streamlined toroidal geometry having a diameter ranging from a few meters to several hundred meters containing a thin-walled superconducting solenoid coil mounted inside with approximately the same diameter. Thus, the vehicle resembles a circular flying wing with a constant length-to-thickness ratio airfoil. The solenoid is charged with current to create a large axial magnetic field in the circular region inside the vehicle's perimeter. The vehicle's superstructure is designed as a stress-bearing containment vessel to support the magnetic stress acting on the charged solenoid which tends to pull it apart and compress it into its mid-plane. The acceleration method involves launching the vehicle with conventional chemical rocket propulsion on a nearly vertical ballistic trajectory which is designed only to reach a vacuum environment at an altitude of about 125 km using relatively little propellant. The energy required to propel the vehicle into the vacuum environment is only about $\frac{1}{10}$ of that required to propel it all the way into orbit. After the vehicle reaches the vacuum environment, it is accelerated to orbital or escape velocities by a traveling repulsive magnetic field.

The traveling repulsive magnetic field is generated by ejecting a low-density, easily ionizable gas cloud behind the vehicle in the magnetic field of the solenoid and transmitting a plane-polarized microwave beam into the cloud from a very large transmitter mounted horizontally on the earth's surface. By selecting a frequency tuned to the electron cyclotron resonant frequency of the vehicle's magnetic field, the incident microwave beam ionizes the gas and accelerates the free electrons into high-energy cyclotron resonant orbits. In view of Lenz's Law, the orbiting electrons become strong magnetic dipoles that oppose the magnetic field of the solenoid. They are accelerated away from the vehicle by magnetic repulsive forces, taking the positively charged ions with them by electrostatic forces. In their aggregate, the orbiting electron dipoles generate a large repulsive magnetic field that travels behind the vehicle that is sustained by the ejected gas cloud and by the microwave beam that is continuously transmitted and focused inside the vehicle's perimeter. The thrust vector lies along the vehicle's central axis. By rotating a pressurized toroidal passenger cabin inside the vehicle, an artificial gravity environment is created which also gives the vehicle gyroscopic spin stability to cancel non-axial magnetic torque from the earth's magnetic field. Since this acceleration method can be used in reverse to decelerate a vehicle approaching the transmitter from space, the vehicles are reusable and can, with the aid of atmospheric breaking, be decelerated to land at the launch site by reversing the steps. By constructing the transmitter horizontally on the earth's surface adjacent the launch site in the form of a multiple-feed, electronically-steered phased array several hundred meters in diameter with a high power density energized by a large system of underground toroidal superconducting energy storage coils, it will be possible to achieve virtually unlimited CW beam power. This power is converted directly into the traveling repulsive magnetic field which accelerates the vehicle over great distances. Atmospheric breakdown is avoided by generating the beam over a large area on the earth's surface and focusing it on the vehicle above the atmosphere. The resulting accelerating force can be many times greater than any previous technically viable vehicle acceleration method. The invention will enable single-stage reusable space vehicles to accelerate enormous payloads to escape velocities with mass ratios that are actually lower than that of long-range airliners.

DRAWINGS

These and other advantages and features of the invention will be apparent from the disclosure, which includes the specification with the foregoing and ongoing description, the claims, and the accompanying drawings wherein:

FIG. 1 is a perspective view illustrating the circular toroidal design of the vehicle containing a charged superconducting solenoid coil generating a static repulsive magnetic field;

FIG. 2 is a perspective view illustrating how the traveling repulsive magnetic field is generated behind the vehicle by a microwave beam tuned to the solenoid's cyclotron's resonant frequency;

FIG. 3 illustrates the vehicle's acceleration trajectory relative to the earth and transmitter;

FIG. 4 is a graph of magnetic field strength versus electron cyclotron resonant frequency of the microwave beam;

FIG. 9 is a horizontal plan view of a magnetically-propelled vehicle further illustrating its toroidal design;

FIG. 10 is an enlarged schematic vertical cross-section through a magnetically-propelled vehicle designed for commercial interplanetary space travel where the mean diameter 2R=200 m, chord=50 m, width=6.25 m, passengers=2,000 and $V_\infty$=100 km/sec;

FIG. 11 is a schematic vertical cross-section through a magnetically-propelled vehicle returning to earth with its aerodynamic braking system deployed; and FIG. 12 illustrates a typical suborbital trajectory of a magnetically-propelled vehicle for high-speed transportation between two widely separated cities.

DESCRIPTION OF THE PREFERRED EMBODIMENT

Figure 5:
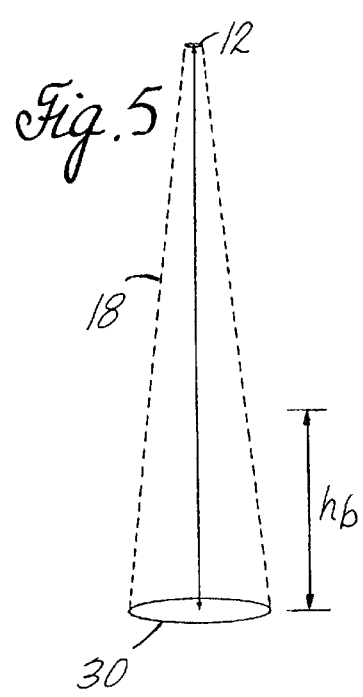
FIG. 5 is a perspective view illustrating how atmospheric breakdown is avoided by utilizing a large diameter phased array constructed horizontally on the earth's surface.

The propulsion system disclosed herein is radically different from any prior propulsion system for space travel in that the underlying method is specifically designed to achieve optimum performance and efficiency. This is achieved by basing the operating principles on "optimum performance principles" and some basic principles of geometry. Consequently, to understand the operating principles of the system, it is important to understand the optimum operating principles behind it. Since it will always be possible to generate more power off a vehicle than on a vehicle, the basic principle of accelerating a space vehicle by beamed power will enable the vehicle to out perform conventional propulsion systems that use an onboard power generating system that adds to the vehicle's inertial mass. But there is a simple geometrical fact that will give the beamed power vehicle acceleration method described here, maximum performance.

A circle has the unique property of enclosing a maximum area for a given perimeter. Consequently, the optimal shape of a vehicle propelled by a given amount of beamed power will be circular (in the form of a thin torus), and the power is equal to the power density multiplied by the vehicle's enclosed area. Since this power does not make physical contact with any part of the vehicle's structure, the power density, and hence the total power, has no upper limit. Therefore, if the power can be converted directly into propulsive thrust with very high conversion efficiency, the system will be capable of generating the highest possible thrust-to-mass ratio. These theoretical optimum performance principles represent the basic design principles of the present system. It can be achieved by mounting a superconducting solenoid inside the circular vehicle, expelling a tenuous gas cloud behind the vehicle in the magnetic field of the solenoid, and beaming the power by a plane-polarized microwave beam tuned to the solenoid's electron cyclotron resonant frequency. This will create a thrust-generating traveling repulsive magnetic field behind the vehicle while moving in space that is sustained by ejecting the gas cloud and by the microwave beam. This is the invention that is disclosed herein.

By designing the microwave transmitter in the form of an electronically-steered, multiple-feed phased array mounted horizontally on the earth's surface in a suitable location, it will be possible to construct the array with essentially unlimited size fed by an unlimited number of microwave generators operating in parallel. Since the vehicle's thrust-to-weight ratio is designed to be greater than 1.0, the acceleration trajectory can be nearly vertical so that only one transmitter is required. The power used to energize the array is provided by a system of toroidal superconducting energy storage coils having diameters of several kilometers embedded underground. Since the stored inductive energy in the coils can be extracted at essentially any power desired for the microwave generators, it will be possible for the array to generate and transmit virtually unlimited power over great distances to give the vehicle an optimum acceleration profile. Atmospheric breakdown is avoided by transmitting the beam over a large area within the atmosphere with relatively low power density, and focusing it on the vehicle above the atmosphere with very high power density. By accelerating the vehicle with relatively low acceleration (e.g., 2 g) over a distance of $3 \times 10^5$ km, velocities exceeding 100 km/sec can be achieved. With these velocities, it will not be necessary to accelerate the vehicle beyond the range of the transmitter to achieve ultra high-speed interplanetary space travel. A similar transmitter constructed near the landing site on another celestial body will provide the deceleration. Thus, with this propulsion concept, it is not necessary to generate any propulsive energy onboard the vehicle beyond that required for guidance. It will be shown that the amount of ejected gas required to reach 100 km/sec is a small fraction of the vehicle's structural mass. Therefore, since the amount of launch propellant is also less than the vehicle's structural mass, the vehicle's overall mass ratio will be remarkably small. In fact, it will be shown that the mass ratios will actually be lower than that of long-range commercial airliners. Although the electrical energy required to charge the superconducting storage coils can be obtained from large photovoltaic arrays, the preferred system will utilize high-temperature, radiatively-cooled, MHD nuclear-electric generators. The problem of radioactive waste disposal can be solved by simply ejecting the waste products out of the Solar System using unmanned cargo vehicles. Since the vehicles are reusable, the cost for space travel will essentially equal the cost for generating the electrical energy. By designing the nuclear power plants to be very reliable and automated, this cost can be reduced to a small fraction of the cost of hydroelectric power.

FIG. 1 illustrates the vehicle's circular design. A superconducting solenoid 10, mounted inside the vehicle 12, generates a static axial magnetic field 14. The vehicle 12 is launched from the earth's surface by a rocket propulsion system 16 to reach a vacuum environment at an altitude of about 125 km. After the vehicle reaches this altitude, a very tenuous gas cloud is ejected behind the vehicle 12 and the microwave beam is turned on. As is shown in FIG. 2, the beam 18 ionizes the gas cloud 20 and accelerates the free electrons into high-energy cyclotron resonant orbits 22. The resulting magnetic field 24 acts repulsively on the magnetic field 14 generated by the solenoid 10 and accelerates the vehicle by magnetic repulsive forces. FIG. 3 illustrates the vehicle's high-inclination acceleration trajectory 26 relative to the earth 28, the transmitter 30, and the microwave beam 18.

To demonstrate the basic engineering feasibility of this microwave-generated traveling repulsive magnetic field vehicle acceleration method it is necessary to show that the vehicle's thrust-to-weight ratio can in fact exceed 1.0. This can be demonstrated by determining the minimum required vehicle mass $M_s$ corresponding to various radii R and microwave frequencies f, showing that these parameters have realizable values, and showing that the corresponding thrust-to-weight ratios are greater than 1.0 for realizable microwave transmitters. The required operating parameters of the vehicle's superconducting propulsion solenoid, such as maximum magnetic field strength $B_m$ and current density J, should also be realizable. In order to accomplish this analysis, it is necessary to present the basic physics behind the system and its mathematical representation.

A charged superconducting solenoid generates an axial magnetic field which can be fairly intense. This magnetic field generates Lorentz forces on the solenoid's conductor which exert various mechanical stresses that must be contained by some supporting mass. Ideally, this supporting mass will be provided by the vehicle's entire structure. Consequently, the vehicle's minimum possible mass is equal to the minimum structural mass required to support the magnetic stress generated by the solenoid mounted inside. This mass depends upon the solenoid's length l, radius R, and total current. Omitting the details, it can be shown that the minimum structural mass $M_s$ required to contain the tension that tends to pull a thin-walled solenoid apart (magnetic hoop-stress) and, simultaneously, the magnetic compressive forces that tend to compress the solenoid into its mid-plane, is given by $$M_s = \frac{\rho}{\sigma} Q(\beta) E \tag{1}$$

where $\rho$ and $\sigma$ are equal to the density and tensile strength of the containment structure, respectively. The quantity E is equal to the solenoid's inductive energy, and $Q(\beta)$ is a structural coefficient determined by the solenoid's aspect ratio $\beta$ which is equal to l/2R. For small values of $\beta$ between 0 and 0.1, the value of $Q(\beta)$ is given approximately by the linear interpolation function $$Q(\beta) = 3.1\beta + 1 \tag{2}$$

(See, Boom, R. W., et al., *Wisconsin Superconductive Energy Storage Project*, Vol. 1, College of Engineering, University of Wisconsin, Jul. 1, 1974, pages v-4, v–5.) The inductive energy E(Joules) of the solenoid is $$E = \frac{Li^2}{2} \tag{3}$$

where i is the cable current (i.e., the current in each turn) and L is the coil's self-inductance.

The self-inductance of a thin-walled solenoid having a radius R (meters), a length l (meters), and N turns is given by $$L = \frac{\pi \mu_0 R^2 N^2 K}{l} \tag{4}$$

where K is a factor given by the series expansion $$K = \frac{2\beta}{\pi}\left[\left(\log\frac{4}{\beta} - \frac{1}{2}\right) + \frac{\beta^2}{8}\left(\log\frac{4}{\beta} + \frac{1}{8}\right) - \frac{\beta^4}{64}\left(\log\frac{4}{\beta} - \frac{2}{3}\right) + \frac{5\beta^6}{1024}\left(\log\frac{4}{\beta} - \frac{109}{120}\right) - \ldots\right] \tag{5}$$

(See Grover, F. W., *Inductance Calculations*, Dover Publications, Inc., New York, 1946, p. 143.) The constant $\mu_0 = 4\pi \times 10^{-7}$ henry/m is the permeability of free space (MKS units are used). Upon substituting equations (2), (3) and (4) into equation (1), the minimum structural mass $M_s$ required to support the solenoid can be expressed as $$r = \frac{v}{(e/m)B} \tag{8}$$

The superconducting cable used in the vehicle solenoid can be designed to be stress-bearing with a very high tensile strength $\sigma_c$, and a low density $\rho_c$. This enables the solenoid to be partially self-supporting. Assuming that the vehicle structure has the same $\sigma$ and $\rho$, and is designed to support the coil, the quantity $M_s$ given in equation (6) is equal to the minimum possible vehicle mass, which includes the coil mass. The fabrication of stress-bearing superconducting cable is described in Pilce, G. E., et al, "Superconducting Properties of Thin Film Niobium Carbonitrides on Carbon Fibers," *IEEE Transactions On Magnetics*, Vol. MAG-11, No.2, March 1975, pp.185–188.

Based on recent advances in materials research (see Ko, T. H. and Huang, L. C., "Preparation of High-Performance Carbon Fibres From PAN Fibres Modified With Cobaltous Chloride," *Journal of Materials Science*, Vol. 27, 1992, pp. 2429–2436), the values of $\sigma$ and $\rho$ can be taken to be:

$$\sigma = 4.5 \times 10^9 \text{ N/m}^2 \text{ and } \rho = 1,520 \text{ kg/m}^3 \tag{7}$$

The ratio of superconducting material to fiber material is relatively small. Consequently, the resulting cable can be assumed to have an effective tensile strength $\sigma = 4.5 \times 10^9$ N/m² and a density $\rho = 1,520$ kg/m³. Since experiments indicate that the cable is intrinsically stable, stabilizer material such as copper or aluminum may be unnecessary. (See the above article by Ko.) However, to provide a high degree of safety, the cable is assumed to have an aluminum stabilizer. (See Huang, X. et al, "High Current Density Aluminum Stabilized Conductor Concepts For Space Applications," *IEEE Transactions On Magnetics*, Vol. 25, No. 2, March 1989, pp. 1532–1535.) For simplicity, it will be assumed that the coil and vehicle have an average $\sigma$ and ρ equal to the numerical values given above. (This assumption is valid because the coil mass will be a small fraction of the total minimum vehicle mass $M_s$.)

If a microwave beam of sufficient intensity is passed through a gas, the gas becomes ionized and the microwave beam is absorbed by ionization and thermalization processes. However, if the gas has very low density, and if a constant magnetic field with a certain intensity is applied, the amount of microwave energy required to ionize the gas can be significantly reduced. (See, MacDonald, A. D., *Microwave Breakdown In Gases*, John Wiley & Sons, Inc., New York, London, Sydney, 1966, p. 135.) If, after ionization, a free electron moves in a plane perpendicular to the magnetic field B with velocity v, the resulting Lorentz force e(v×B) will force the electron to move in a circular path with radius r given by $$M_s = \frac{\rho(3.1\beta+1)\mu_0 \pi K R^2 N^2 i^2}{2\sigma l} \qquad (6)$$

where e/m is a constant equal to the electron's charge-to-mass ratio, equal to $1.7589 \times 10^{11}$ coulomb/kg. The orbital period p (gyration period) is $$p = \frac{2\pi}{(e/m)B} \qquad (9)$$

It is important to notice that this period is independent of the electron's velocity v, and hence independent of its energy.

If the microwave radiation is plane-polarized and has a frequency f equal to the electron's gyration frequency 1/p, the energy transfer mechanism called electron cyclotron resonance is achieved. When this occurs, the orbiting electrons are accelerated on successive revolutions by the oscillating electric field vector of the microwave radiation. Since this is the underlying principle of the classical cyclotron, the phenomenon is known as electron cyclotron resonance. The cyclotron resonant frequency f=1/p, is $$f = \frac{B(e/m)}{2\pi} \qquad (10)$$

FIG. 4 is a graph of the cyclotron resonant frequency f versus the magnetic field intensity B given by equation (10).

If the electron-ion collision frequency is significantly below the cyclotron resonant frequency f of the microwave radiation, the orbiting electrons continue to absorb microwave radiation by cyclotron resonance in a nearly collisionless acceleration process. The electrons are thus pumped into very high-energy cyclotron orbits perpendicular to the magnetic field lines. A strong coupling between the plasma and the microwave radiation is created, resulting in the absorption of essentially all the microwave radiation. This can be achieved if the gas has a very low-density and there is no interfering background gas.

An electron moving in a cyclotron orbit is a microscopic magnetic dipole, with current i=e/p=ef that generates a central microscopic magnetic field $B_e$ given by $$B_e = \frac{\mu_0 i}{2r} = \frac{\mu_0 e f}{2r}$$

In view of Lenz's Law, the direction of this microscopic field opposes the applied magnetic field. If the applied field has a gradient, a strong microscopic repulsive force is generated. It is important to recognize that these operating principles of electron cyclotron resonance are independent of the dimensions of the applied field.

The net resultant magnetic field generated by any number of electrons moving in cyclotron orbits is equal to the vector summation $\Sigma B_e$ of the microscopic magnetic fields $B_e$ generated by the individual electron dipoles. Since the number of such electrons obtained by ionizing a low-density gas is very large, the resultant field can be quite large and this field will be repulsive with respect to the applied field.

Since the vehicle is essentially a very large superconducting magnetic solenoid, these principles can be utilized most effectively to generate a traveling repulsive magnetic field behind the vehicle after it is launched and enters a vacuum environment at high altitude. This is achieved by ejecting an easily ionizable gas cloud into the magnetic field and transmitting a high-power plane-polarized microwave beam from the earth's surface with a frequency tuned to an electron cyclotron resonant frequency of the vehicle's magnetic field. If the microwave beam remains focused on the circular region inside the vehicle's inner perimeter (i.e., inside the solenoid), the intensity of the traveling repulsive magnetic field and, hence, the resulting accelerating thrust will not decrease with increasing distance from the transmitter. By generating the microwave beam with a multiple-feed, electronically-steered phased array constructed horizontally on the earth's surface with a diameter of several hundred meters fed by electric current from a sufficiently large inductive superconducting energy storage system it will be possible to achieve levels of accelerating thrust many times greater than any presently known, technically viable propulsion concept. Moreover, this acceleration process is basically magnetic, and hence very efficient.

After the vehicle is launched onto a nearly vertical ascent trajectory by the chemical propulsion system and coasts to a vacuum environment at an altitude of approximately 125 km (where the velocity is essentially zero): a system of gas injectors mounted around the inner walls of the vehicle project a low-density gas cloud behind the vehicle. At this point, the microwave transmitter is turned on (with gradually increasing power), and the beam 18 is focused inside the vehicle's perimeter which ionizes the gas cloud 20. (See FIGS. 1 and 2.) The frequency of the microwave beam 18 is designed to produce electron cyclotron resonance in the region of the vehicle's magnetic field 14 where the magnetic repulsive force generated by the gyrating cyclotron electrons 22 will be maximum. It will be shown that this optimal electron cyclotron resonance region is located behind the vehicle, a distance equal to one-half the vehicle radius from the mid-plane.

In view of the resonant magnetic field, the amount of microwave power required to ionize the gas represents a small fraction of the total beam power. As described in MacDonald's book cited above, the magnetic field reduces the required ionization energy to about 1/20 the energy normally required. The free electrons absorb the microwave energy by being accelerated into high-energy cyclotron orbits. A strong coupling between the plasma and the microwave beam is created, resulting in the absorption of essentially all the beam power by the plasma. But unlike most beamed-power vehicle propulsion concepts, this absorption is not thermalization. Most of the power is pumped into extremely high-energy electron cyclotron orbits. The orbiting electrons become strong magnetic dipoles that oppose the vehicle's magnetic field. They are accelerated away from the vehicle by magnetic repulsive forces, taking the positively charged ions with them by electrostatic forces. In their aggregate, the orbiting electron dipoles generate a very large traveling repulsive magnetic field behind the vehicle that is sustained by the ejected gas cloud and by the microwave beam that is continuously transmitted and focused at the vehicle. Since the beam quality is very high and since there is no interfering background gas, the acceleration process is very efficient. Essentially all of the beam power received at the vehicle is converted directly into magnetic repulsive thrust with a conversion efficiency approaching 95%. The process enables vast amounts of inexpensive microwave power to be converted directly into propulsive thrust. Since the vehicle is accelerated along a high inclination trajectory 26 (see FIG. 3) that is maintained nearly broadside to the transmitting antenna 30 by a gyro attitude control system, it can be accelerated over great distances to achieve very high escape velocities. The method could also be used to place an enormous payload into geo-synchronous orbit, or to catapult an enormous payload onto a low-energy escape trajectory that could be subsequently propelled by gravity propulsion to return the vehicle to Earth. (See Dowling, R. L., et al., "Gravity Propulsion Research at UCLA and JPL, 1962–1964," International Academy of Astronautics, IAA Paper 91–677, Oct. 1991) When such a vehicle approaches a target body, the payload is released, soft-landed on the surface, and the vehicle returns to earth on a non-stop, free-fall, round-trip trajectory. It will be shown that a convoy of such vehicles could deliver enormous payloads to other celestial bodies at a cost not significantly higher than large ocean freighters.

An important operating feature of this vehicle acceleration concept is the fact that the microwave beam does not have to propagate along the central axis of the vehicle in order to pump the electrons. Since the microwave beam is plane-polarized, the oscillating electric field vector of the microwave beam that pumps the electrons into their resonant cyclotron orbits will always be perpendicular to the central axis if the microwave beam is in the vehicle's trajectory plane (which is assumed to be perpendicular Lo the earth's surface). This condition can always be satisfied by constructing the transmitter near the launch site. The electrodynamic principles of this vehicle acceleration concept are illustrated in FIG. 2. These operating principles will now be described analytically for a quantitavative engineering feasibility analysis.

If two coaxial circular dipole coils with radii $R_1$ and $R_2$ with current $i_1$ and $i_2$ in opposite directions, respectively, where $R_1 \gg R_2$ are separated by a distance h, then the force of repulsion F can be expressed to a close approximation by the equation $$F = \frac{3\pi\mu_0 R_1^2 R_2^2 i_1 i_2 h}{2(R_1^2 + h^2)^{5/2}} \quad (11)$$

(See Bohn, E. V., Introduction To Electromagnetic Fields And Waves, Addison-Wesley Publishing Co., 1968, pp. 219–220.)

If the aspect ratio β of a thin-walled solenoid with radius R and total current Ni is small (β<0.1), its magnetic field can be approximated by a simple dipole with the same radius and same total current. Consequently, if an electron is moving in a constant energy orbit with radius r coaxially behind the vehicle solenoid with radius R, it follows that since R>>r, equation (11) represents the elementary magnetic force of repulsion acting between the solenoid and the orbiting electron dipole where h represents the distance from the solenoid's mid-plane. It follows from this equation that the repulsive force F is zero when h=0, increases with increasing values of h to some maximum value $F_{max}$ at some distance $h_r$, and begins decreasing when h increases beyond $h_r$. The distance $h_r$ that produces $F_{max}$ can be determined by solving $$\frac{dF}{dh} = 0$$

where F is given by equation (11). Omitting the mathematics, this distance of maximum repulsive force is $$h_r = \frac{R}{2} \quad (12)$$

It is important to note that the distance of maximum magnetic repulsive force $F_{max}$ given by equation (12) is independent of current and r.

The magnetic field intensity B at any point along the central axis of a thin-walled solenoid with N turns is $$B = \frac{\mu_0 Ni}{2l}(\cos\theta_1 - \cos\theta_2) \quad (13)$$

where $\theta_1$ and $\theta_2$ are the angles subtended by the radii of the ends of the solenoid where B is measured. (See Stratton, J. A., Electromagnetic Theory, McGraw-Hill Book Co., New York, London, 1941, p.233.) Consequently, the magnetic field strength $B_r$ at distance $h_r$=R/2 corresponding to the maximum repulsive force $F_{max}$ is $$B_r = \frac{\mu_0 Ni}{2l}\left(\frac{R+l}{[(l+R)^2 + 4R^2]^{1/2}} - \frac{R-l}{[(R-l)^2 + 4R^2]^{1/2}}\right) \quad (14)$$

The dashed curve 31 in FIG. 2 describes the region behind the solenoid 10 where the magnetic field strength is equal to $B_r$.

Since the maximum magnetic repulsive force between the gyrating electrons and the superconducting solenoid coil 10 occurs at a distance h=R/2, the frequency f of the incoming microwave beam 18 is designed to produce electron cyclotron resonance when the magnetic field is equal to $B_r$. This maximizes the magnetic repulsive force acting on the solenoid 10 by the gyrating cyclotron electrons 22. (FIGS. 1 and 2.).

When the free electrons of the ionized gas enter the resonant magnetic field $B_r$ they are rapidly accelerated into transverse cyclotron orbits by the microwave beam. They become strong magnetic dipoles and, hence, are accelerated away from the vehicle's solenoid coil via magnetic repulsive forces. The ionized gas is pulled along with the electrons by the resulting electrostatic charge separation.

Let u denote the terminal velocity (relative to the vehicle) of the neutral plasma stream after being accelerated from the vehicle by the free electrons. If $\eta_c$ is equal to the conversion efficiency of microwave energy into directed plasma kinetic energy, $\eta_c$ can be expressed by $$\eta_c = \frac{\dot{m}u^2}{2P}$$

where P is equal to the total beam power intercepted by the vehicle and m is equal to the mass flow rate of the plasma stream. Hence $$u = \sqrt{2\eta_c P/\dot{m}} \qquad (15)$$

The accelerating thrust F=(magnetic repulsive force acting on the vehicle's solenoid generated by the gyrating electrons) is equal to $$F=\dot{m}u \qquad (16)$$

In view of equations (15) and (16), the repulsive force can be expressed as $$F = \sqrt{2\eta_c P \dot{m}} \qquad (17)$$

The gas is ejected from the vehicle through an ejection system mounted 360° around the inside perimeter. The ejection system is designed to generate a low-density gas cloud in the optimum cyclotron resonance region behind the vehicle. If $u_0$ denotes the average gas ejection velocity along the vehicle's longitudinal axis, the number density n is given approximately by $$n = \frac{R}{u_0 A} \qquad (18)$$

where R is equal to the ejection rate (molecules/sec) and A is equal to the vehicle's cross-sectional area $\pi R^2$. Hence, the mass flow rate $\dot{m}$ can be expressed as $$\dot{m} = n u_0 A \rho_m \qquad (19)$$

where $\rho_m$ is equal to the molecular mass (kg/molecule). Consequently, the accelerating thrust F can be expressed as $$F = \sqrt{2\pi \eta_c P n u_0 \rho_m}\ R \qquad (20)$$

Previous studies of plasma accelecration by elcetron cyclotron resonanec using microwave power at a frequency of 8.35 GHz with argon indicate that a gas stream density of $2 \times 10^{19}$ molecules/$M^3$ will produce a nearly collisionless acceleration process with essentially zero thermalization, i.e. $\eta_c$ will be nearly 1.0. (See, Kosmahl, H. G. et al, "Plasma Acceleration With Microwaves Near Cyclotron Resonance," *Journal of Applied Physics, Vol.* 38, No. 12, Nov. 1967, pp. 4576–4582.) The number density of the atmosphere at an altitude of 125 km is $2.5 \times 10^7$ molecules/m³. Therefore, to eliminate the presence of background atmospheric gas from interfering with the electrodynamics of electron cyclotron acceleration, the microwave acceleration will begin after the vehicle has reached an altitude of 125 km. At this altitude, the ambient pressure is $1.2 \times 10^{-5}$ Torr. Consequently, the collision frequency with background atmospheric gas will be negligible when the microwave acceleration begins. Since most of the microwave acceleration occurs above 150 km, it can be assumed that the microwave acceleration occurs in a perfect vacuum environment with no background gas.

One of the most important considerations effecting the transmission of microwave power through the atmosphere concerns atmospheric breakdown. The total propulsive power P that is focused into the vehicle's electron cyclotron resonance region is $$P=\pi R^2 S \qquad (21)$$

where S is equal to the power density. Since the microwave beam makes no physical contact with the vehicle, (most of the beam energy is absorbed by the cyclotron electrons), S can be very large. However, the maximum power density of the microwave beam that can be transmitted from the earth's surface is limited by the effects of atmospheric breakdown.

The minimum beam diameter $D_m$ at a distance D that can be achieved by focusing a phased array transmitter with diameter $D_t$ is $$D_m = \frac{\lambda D}{D_t} \qquad (22)$$

(See, Hansen, R. C., "Focal Region Characteristics of Focused Array Antennas," *IEEE Transactions On Antennas and Propagation,* Vol. AP-33, No. 12, Dec. 1985, pp. 1328–1337.) For maximum power transfer efficiency, the transmitter is designed to maintain the beam focused on the vehicle with a diameter equal to the vehicle's diameter $D_v$. This will be possible if the distance D between the transmitter and the vehicle is less than $(D_t D_v)/\lambda$. Since $D_t$ and $D_v$ are very large, this distance can be very large, especially at high frequencies.

The breakdown power density P of microwave radiation passing through the atmosphere depends upon atmospheric pressure and the microwave frequency. The minimum breakdown power density $\rho_b$ is approximately proportional to the frequency squared and can be expressed to a close approximation by $$\pi_b = Cf^2 \qquad (23)$$

where $C=4 \times^{-14}$ W/m². (See, Scharfina, W. E. et al, "Breakdown Limitations on the Transmission of Microwave Power Through the Atmosphere," *IEEE Tranvsactions on Antennas and Propagation,* Nov. 1964, pp.709–717, and Altshuler, E. E. and Marr, R. A., "Cloud Attenuation at Millimeter Wavelengths," IEEE Transactions On Antennas and Propogation, Vol. 37, No. 11, Nov. 1989, pp. 1473–1479.) The breakdown occurs when the pressure is between 10 and 0.1 Torr. This pressure range corresponds to altitudes between 40 km and 60 km. The breakdown power density increases fairly rapidly at altitudes outside this range. For microwave frequencies between 5 and 30 GHz, the breakdown altitude is approximately 47 km where the pressure is 1.0 Torr. By constructing the microwave transmitter horizontally on the earth's surface in the form of an electronically-steered, phased array covering a large area several hundred meters in diameter, it will be possible to transmit hundreds of terawatts of CW microwave power over great distances without atmospheric breakdown.

The geometry of the focused microwave beam 18 is shown in FIG. 5. If $R_t$ is equal to the radius of the microwave transmitter 30 and $H_b$ is equal to the breakdown altitude having minimum breakdown power density $\rho_b$, then the maximum power $P_{max}$ that can be transmitted from the array to the vehicle 12 at altitude H directly above the transmitter 30 without atmospheric breakdown can be expressed as $$P_{max} = \pi\left(\frac{H-H_b}{H}(R_t - R) + R\right)^2 \rho_b \qquad (24)$$

Assuming $R_t > R$, the maximum power density of the transmitter is equal to $\rho_b$.

Equation (24) demonstrates that the maximum possible transmitted power $P_{max}$ increases with increasing vehicle distance until the focusing distance $(D_t D_v)/\lambda$ is reached. At this distance, the beam diameter at the top of the atmosphere is maximum and nearly equal to the diameter of the transmitter. (See FIG. 5.) After the vehicle passes beyond the focusing distance, it will not be possible to keep the beam diameter equal to the vehicle diameter, and power will be lost due to spill-over. In this situation, the maximum possible power $\overline{P_{max}}$ reaching the vehicle begins to decrease with increasing distance given by $$\overline{P_{max}} = \eta_t P_{max}\left(\frac{D_t D_v}{\lambda H}\right)^2 \qquad (25)$$

where $P_{max}$ is given by equation (24) and $v_t$ is equal to the transmission efficiency.

Atmospheric attenuation (dB loss) of microwave power depends upon wavelength, humidity, and beam elevation angle. The power transmission efficiency $\eta_t$ through the atmosphere, defined as the ratio of power received $P_r$ to power transmitted $P_t$, is related to dB loss by $$\eta_t = 10^{-dB/10} = \frac{P_r}{P_t} \qquad (26)$$

The total current $Ni_r$ required to generate an optimum resonant magnetic field $B_r$ in a solenoid having an aspect ratio $\beta$ and a radius R corresponding to a microwave frequency f can be obtained from equations (10) and (14). This equation is $$Ni_r = \frac{8\pi R \beta f}{\mu_0(e/m)}\left(\frac{1+2\beta}{[(1+2\beta)^2+4]^{1/2}} - \frac{1-2\beta}{[(1-2\beta)^2+4]^{1/2}}\right)^{-1} \qquad (27)$$

When this total coil current $Ni_r$ is substituted into equation (6), the corresponding minimum structural mass $M_s$ required to support the solenoid (the minimum vehicle mass) can be obtained. The result is $$M_s = \frac{\pi\mu_0 K(3.1\beta + 1)R^3 \mathcal{F}^2}{4\beta(\sigma/\rho)} \qquad (28)$$

where the auxiliary function $F(\beta,f)$ is defined as $$\mathcal{F}(\beta, f) = \frac{8\pi R \beta f}{\mu_0(e/m)}\left(\frac{1+2\beta}{[(1+2\beta)^2+4]^{1/2}} - \frac{1-2\beta}{[(1-2\beta)^2+4]^{1/2}}\right)^{-1} \qquad (29)$$

Figure 6:
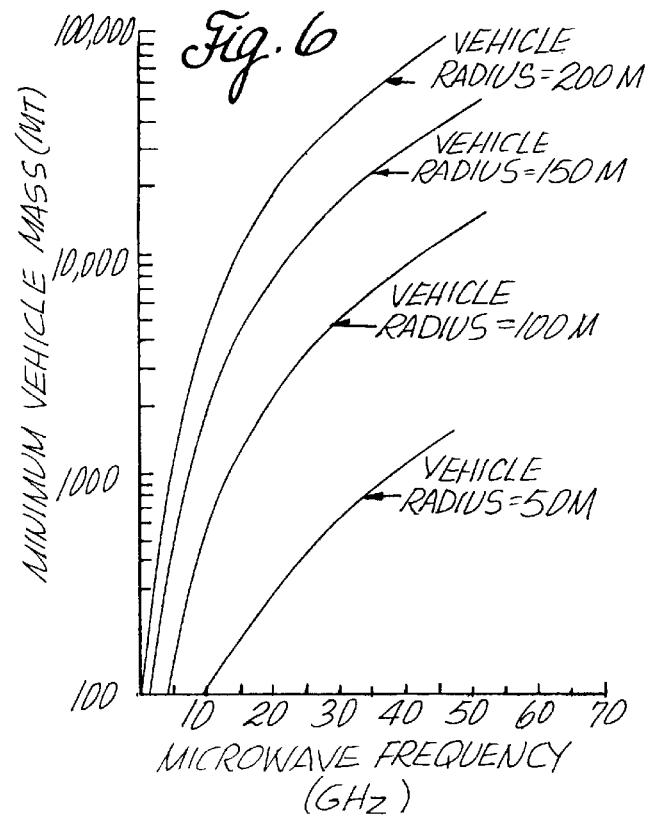
FIG. 6 is a parametric system of graphs of minimum vehicle mass $M_s$ versus microwave frequency f corresponding to various vehicle radii where $\sigma/\rho = 3.0 \times 10^6$ J/kg and $\beta = 0.07$.

To limit power loss due to atmospheric attenuation, the microwave frequencies should not exceed 50 GHz. Table 1 gives the minimum vehicle mass corresponding to various radii R and microwave frequencies ranging between 5 GHz and 50 GHz obtained from equation (28). The value of o/p is assumed to be $3 \times 10^6$ J/kg, which is based on the engineering data given in (7). The aspect ratio $\beta$ is assumed to be 0.07. FIG. 6 is a parametric system of graphs of Ms versus microwave frequency f corresponding to various vehicle radii with $\beta = 0.07$.

TABLE 1

Minimum Structural Mass of Magnetically Accelerated Vehicles Corresponding to Various Frequencies f and Vehicle Radii R. ($\sigma/\rho = 3 \times 10^6$ J/kg, $\beta = 0.07$)

| f (GHz) | $M_s$ (kg) | | | | |
|---|---|---|---|---|---|
| | R = 25 m | R = 50 m | R = 100 m | R = 150 m | R = 200 m |
| 5 | 2.23 × 10³ | 1.78 × 10⁴ | 1.43 × 10⁵ | 4.82 × 10⁵ | 1.14 × 10⁶ |
| 10 | 8.92 × 10³ | 7.14 × 10⁴ | 5.71 × 10⁵ | 1.93 × 10⁶ | 4.57 × 10⁶ |
| 15 | 2.01 × 10⁴ | 1.61 × 10⁵ | 1.28 × 10⁶ | 4.34 × 10⁶ | 1.03 × 10⁷ |
| 20 | 3.57 × 10⁴ | 2.85 × 10⁵ | 2.28 × 10⁶ | 7.71 × 10⁶ | 1.83 × 10⁷ |
| 25 | 5.58 × 10⁴ | 4.46 × 10⁵ | 3.57 × 10⁶ | 1.20 × 10⁷ | 2.85 × 10⁷ |
| 30 | 8.03 × 10⁴ | 6.42 × 10⁵ | 5.14 × 10⁶ | 1.73 × 10⁷ | 4.11 × 10⁷ |
| 35 | 1.09 × 10⁵ | 8.74 × 10⁵ | 6.99 × 10⁶ | 2.36 × 10⁷ | 5.60 × 10⁷ |
| 40 | 1.43 × 10⁵ | 1.14 × 10⁶ | 9.14 × 10⁶ | 3.08 × 10⁷ | 7.31 × 10⁷ |
| 45 | 1.81 × 10⁵ | 1.45 × 10⁶ | 1.16 × 10⁷ | 3.90 × 10⁷ | 9.25 × 10⁷ |
| 50 | 2.23 × 10⁵ | 1.78 × 10⁶ | 1.43 × 10⁷ | 4.82 × 10⁷ | 1.14 × 10⁸ |

Since the vehicle has a circular toroidal geometry resembling a circular flying wing with constant cord and is launched and landed vertically with its mid-plane parallel to the earth's surface, these minimum mass requirements are well within engineering feasibility. It will be relatively easy to support such a vehicle on the ground by a system of relatively small retractable legs mounted 360° around the base. Although the vehicle's diameter can be very large, the low aspect ratio gives the vehicle a relatively small height. Consequently, there is no physical upper limit on the vehicle's size and mass. This is not possible with conventional cylindrical vehicle designs that are launched vertically or horizontally with wings.

A very important design feature is the fact that the rocket propelled launch system only has to catapult the vehicle ballistically to a peak altitude of 125 km where the velocity will be close to zero. Since the energy of this ascent trajectory is a small fraction of orbital energy, the required mass ratio is only about 1.60. This fact has very important vehicle design implications because the propellant tanks needed to carry the rocket propellant will be relatively small.

Another important operating feature is the vehicle's relatively low ascent velocity through the atmosphere. It will be shown that the maximum velocity will be 1,350 m/sec (Mach 4.4) which will occur at burn-out at an altitude of about 32,000 m. Thus, there will be relatively little aerodynamic heating. The magnetic propulsion will decelerate a returning vehicle outside the atmosphere such that the reentry velocity will be close to zero at 125 km. This enables a circular flexible Kevlar sheet to be deployed over the vehicle's upper end prior to reentry to serve as a large ballute for aerodynamic braking. In view of the vehicle's circular geometry, this aerodynamic braking will be extremely effective. Thus, relatively little retro rocket propulsion is required for a soft landing, thereby enabling the vehicle's total mass ratio to be very low.

Having shown that the required minimum vehicle mass $M_s$ is well within engineering feasibility, the next important consideration is the required operating parameters of the superconducting solenoid corresponding to various vehicle radii and microwave frequencies.

The maximum magnetic field intensity Bin at the midplane surface of a thin-walled, low-aspect ratio solenoid ($\beta<0.1$) with length l and N turns is $$B_m = \frac{\mu_0 Ni}{2l} \quad (30)$$

where i is equal to the current in each turn. (See, Boast, W. B., *Principles Of Electric And Magnetic Fields*, Harper & Brothers, New York, 1948, p. 253.) In order for the solenoid to generate optimum electron cyclotron resonance with a microwave beam having frequency f, the solenoid's total current $Ni_r$ is given by equation (27). Consequently, the maximum magnetic field acting on the solenoid's superconductor can be expressed by the equation $$B_m = \frac{\mu_0 \mathcal{F}}{4\beta} \quad (31)$$

Notice that $B_m$ is independent of the coil radius R and depends solely on the aspect ratio P and the microwave frequency f.

Since the solenoid can be maintained at 1.8° K liquid helium temperature, the superconductor's current density $J_3$ can be assumed to be $10_6$ amp/cm². However, if the superconductor comprises 15% of the cable's total cross-sectional area, the cable current density $J_c=1.5\times10^5$ amp/cm² ($1.5\times10^9$ amp/m²). Consequently, assuming that the solenoid's superconductor is designed to operate with a maximum current density $J_c = 1.5\times10^9$ amp/m², the total cable mass $M_c$ of the solenoid is $$M_c = 2\pi R(Ni_r/J_c)\rho$$

which can be expressed as a function of the resonant microwave frequency by the equation $$M_c = \frac{2\pi R^2 \mathcal{F} \rho}{J_c} \quad (32)$$

Table 2 gives the maximum magnetic field strength $B_m$ and the mass $M_c$ of the propulsion solenoids corresponding to the vehicles described in Table 1.

Figure 7:
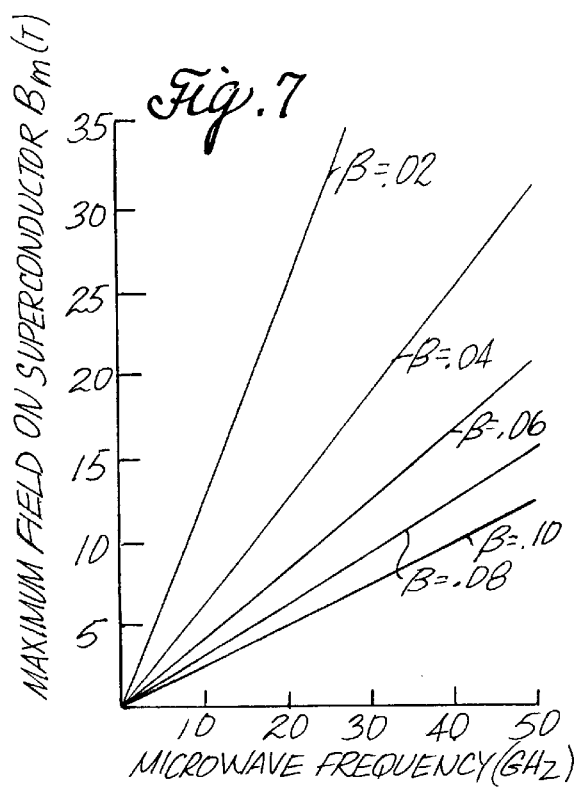
FIG. 7 is a parametric system of graphs of maximum magnetic field strength $B_m$ acting on the solenoid's superconductor versus microwave frequency f corresponding to various aspect ratios $\beta$.

This table shows that the coil mass $M_c$ that generates the vehicle's repulsive magnetic field comprises a relatively small fraction of the minimum supporting mass $M_s$ that is required to contain its magnetic stress. This supporting mass is provided by the vehicle's circular superstructure and by the coil itself. The table also demonstrates that the maximum magnetic field strengths $B_m$, acting on the coils at 1.8° K liquid helium temperature with a current density $J_s=10^6$ amp/cm², are well within the state of the art. (See, Gregory, E. et al, "High Strength NB$_3$SN Conductors For High Magnetic Field Applications," *IEEE Transactions On Magnetics*, VO1. 27, No. 2, March 1991, pp. 2033–2036 and Chernoplekov, N.A-, "Progress In Research and Development For High Temperature and Low Temperature Superconductors," *IEEE Transactions On Magnetics*, Vol. 28, No. 1, Jan. 1992, pp. 121–127.) FIG. 7 is a parametric system of graphs of $B_m$ versus microwave frequency f corresponding to various aspect ratios $\beta$.

Having developed the above mathematical description of the traveling magnetic field propulsion system, it is now possible to establish engineering feasibility (i.e., to show that the propulsion system will give the vehicle a thrust-to-weight greater than 1.0) and to conduct quantitative performance analysis. This analysis is based upon experimental data obtained from small microwave generated plasma accelerators using the principle of electron cyclotron resonance, and scaling up the dimensions which are independent of these parameters. This experimental data indicates that by injecting argon gas with a low number density $n=2\times10^{19}$ molecules/m³ into a resonant magnetic field operating at a microwave frequency of 8.35 GHz, it will be possible to achieve nearly ideal collisionless electron cyclotron resonance pumping by the microwave beam. (Sec the above mentioned article by Kosnmahl.) Essentially all of the incoming microwave power will be converted into kinetic energy of the gyrating electrons which are accelerated by magnetic repulsive forces away from the solenoid in a directed plasma stream. If this number density is used with a higher microwave frequency, the process becomes even more efficient. Since the atmosphere has a natural microwave transmission window at 30 GHz, this frequency is selected as the preferred operating frequency of the propulsion system. (See, Takayama, K. et al, "CW 100 MW Microwave Power Transfer in Space,"*JBIS*, Vol. 44, 1991, pp. 573–578.) Consequently, by designing the gas injection

TABLE 2

Maximum Magnetic Field Strength $B_m$ and Mass $M_c$ of Superconducting Propulsion Solenoids Corresponding to Various Microwave Frequencies ($J_s = 10^6$ amp/cm² at 1.8° K., $\beta = 0.07$, $\rho = 1,520$ kg/m³)

| f (GHz) | $B_m$ (T) | $M_s$(kg) | | | | |
|---|---|---|---|---|---|---|
| | | R = 25 m | R = 50 m | R = 100 m | R = 150 m | R = 200 m |
| 5 | 1.78 | $1.58 \times 10^3$ | $6.32 \times 10^3$ | $2.53 \times 10^4$ | $5.69 \times 10^4$ | $1.01 \times 10^5$ |
| 10 | 3.57 | $3.16 \times 10^3$ | $1.26 \times 10^4$ | $5.06 \times 10^4$ | $1.14 \times 10^5$ | $2.02 \times 10^5$ |
| 15 | 5.35 | $4.74 \times 10^3$ | $1.90 \times 10^4$ | $7.59 \times 10^4$ | $1.71 \times 10^5$ | $3.04 \times 10^5$ |
| 20 | 7.13 | $6.32 \times 10^3$ | $2.53 \times 10^4$ | $1.01 \times 10^5$ | $2.28 \times 10^5$ | $4.05 \times 10^5$ |
| 25 | 8.91 | $7.90 \times 10^3$ | $3.16 \times 10^4$ | $1.26 \times 10^5$ | $2.85 \times 10^5$ | $5.06 \times 10^5$ |
| 30 | 10.70 | $9.49 \times 10^3$ | $3.79 \times 10^4$ | $1.52 \times 10^5$ | $3.41 \times 10^5$ | $6.07 \times 10^5$ |
| 35 | 12.48 | $1.11 \times 10^4$ | $4.43 \times 10^4$ | $1.77 \times 10^5$ | $3.98 \times 10^5$ | $7.08 \times 10^5$ |
| 40 | 14.26 | $1.25 \times 10^4$ | $5.06 \times 10^4$ | $2.02 \times 10^5$ | $4.55 \times 10^5$ | $8.09 \times 10^5$ |
| 45 | 16.05 | $1.42 \times 10^4$ | $5.69 \times 10^4$ | $2.28 \times 10^5$ | $5.12 \times 10^5$ | $9.11 \times 10^5$ |
| 50 | 17.83 | $1.58 \times 10^4$ | $6.32 \times 10^4$ | $2.53 \times 10^5$ | $5.69 \times 10^5$ | $1.01 \times 10^6$ | system to inject the gas into the solenoid's magnetic field with a uniform particle density of $2\times10^9$ molecules/m$^3$ in a hard vacuum environment with no interfering background gas, it will be possible to obtain a microwave coupling efficiency with ionized gas close to the ideal theoretical limit (i.e., $\eta_c \cong 1.0$).

The argon gas injection system is also designed to inject the gas into the magnetic field with an axial velocity $u_0=1,500$ m/sec. The energy required can be obtained by utilizing some of the incoming microwave power that is not completely absorbed by the gas. A plurality of microwave horns, mounted 360° around the base of the vehicle, could be used to capture some of this power. A small fraction could be converted into electrical power to compress liquefied argon to high pressure (e.g., 500 Bar). The remaining portion could be used to vaporize and heat it to 2,000° K. The heated compressed gas could then be ejected through a system of miniature nozzles positioned around the inside periphery of the vehicle to generate the gas cloud uniformly with the desired axial velocity.

The mass flow rate $\dot{m}$ of the ejected argon gas cloud used to create the traveling repulsive magnetic field is $$\dot{m} n u_0 \rho_m \pi R_v^2 \qquad (33)$$

where the molecular mass $\rho_m = 6.634\times10^{-26}$ kg/molecule. Since the number density n is very low, the mass flow rate $\dot{m}$ is low. This will give the propulsion system an extremely low mass ratio. It is important to note that in view of equation (33), the rate of mass flow is independent of the beamed microwave power P and the propulsive thrust F. Table 3 gives the mass flow rates $\dot{m}$ corresponding to various vehicle radii.

TABLE 3

Mass Flow Rates $\dot{m}$(kg/sec) of the Ejected Argon Gas Cloud Corresponding to Various Vehicle Radii

| Vehicle Radii = | R = 25 m | R = 50 m | R = 100 m | R = 150 m |
|---|---|---|---|---|
| $\dot{m}$(kg/sec) = | 3.91 | 15.63 | 62.52 | 140.68 |

Since it is not be possible to design a vehicle such that all of its structural mass can be utilized to support the coil stress, the actual minimum mass $M_0$, will exceed the theoretical minimum mass $M_s$ by at least 50%. To be conservative, it will be assumed that the actual minimum vehicle mass exceeds $M_s$ by 100%. Hence, for the thrust-to-weight analysis given here, the vehicle's empty structural mass $M_0=2M_s$.

It follows from equation (24) that the minimum propulsive power $P_r$ received from a microwave transmitter operating at the maximum power density always occurs when the vehicle is closest to the transmitter at the minimum altitude of 125 km. If this minimum beam power is not sufficiently high, the vehicle's initial thrust-to-weight ratio at the beginning of the magnetic propulsion will be less than 1.0, and the vehicle will fall back to earth. Since the operating frequency is 30 GHz, the minimum vehicle mass $M_0=2M$, obtained from equation (28), is completely determined by it's radius $R_v$. (See Table 1.).

The atmospheric breakdown power density $\rho_b$ at an operating frequency of 30 GHz is $3.60\times10^7$ W/$^2$, and occurs at an altitude $H_b$ of 47 km. Consequently, the maximum power $P_{max}$ that can be transmitted (without atmospheric breakdown) to a vehicle with radius $R_v$ at an altitude H directly above the transmitter is completely determined by it's radius R, and given by equation (24). The microwave transmitter is designed to operate with a variable power density where the maximum is $3.60\times10^7$ W/$^2$ (3.6 KW/cm$^2$). This maximum power density is well within the state of the art. (See Benford, J. and Swegle, J., "An Introduction to High Power Microwaves," *Microwave Journal*, Feb. 1992, pp. 105–116, and Hill, B. I., "High Power Tubes For Phased Array Applications," Ch. 3.2 in, *Microwave Power Engineering*, Vol. 2, E. C. Okress (ed.), Academic Press, New York, 1968, pp. 249–255.) The atmospheric zenith attenuation for a 30 GHz microwave beam is 0.26 dB. (See Takayama, K. et al, "CW 100 MW Microwave Power Transfer in Space," *JBIS, Vol.* 44,1991, pp. 573–578.) Hence, in view of equation (26), the corresponding power transmission efficiency $\eta_t=0.942$.

Figure 8:
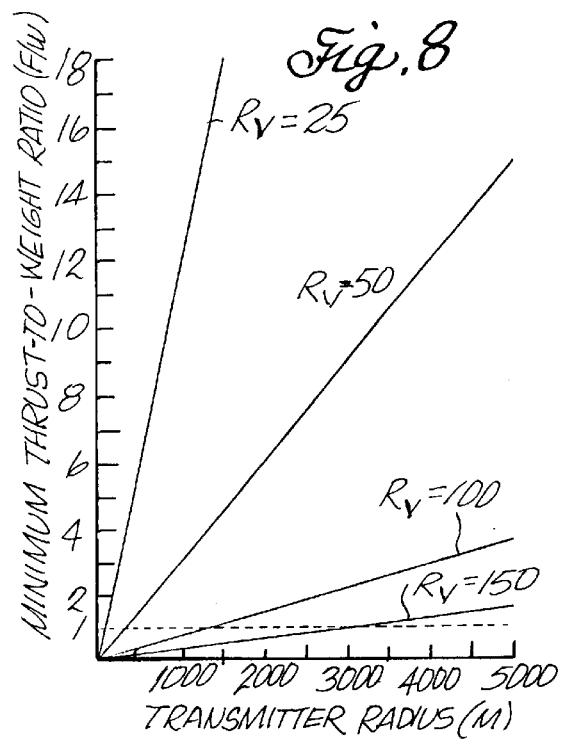
FIG. 8 is a parametric system of graphs of minimum thrust-to-weight ratios versus transmitter radii corresponding to various vehicle radii operating at 30 GHz where $\sigma/\rho = 3.0 \times 10^6$ J/kg and $\beta = 0.07$.

By diving numerical values to the particle number density n ($2\times10^{19}$ molecules/m$^3$), the axial stream velocity $u_0$ (1,500 m/sec), and the molecular mass $\rho_m$ ($6.634\times10^{-26}$ kg/molecule), the vehicle's minimum propulsive thrust F, given by equation (20), is completely determined by it's radius R where the propulsive power $P=\eta_t\eta_c P_{max}$. In view of ionization losses, the microwave coupling efficiency will be about 0.95. Consequently, the vehicle's minimum thrust-to-weight ratio $F/M_0$ g (where g=9.43 m/sec$^2$) is completely determined by it's radius $R_v$, and the radius $R_t$ of the microwave transmitter. Table 4 is a list of these ratios corresponding to various values of $R_v$ and $R_t$ where $M_0=2M_s$. FIG. 8 is a parametric system of graphs of minimum thrust-to-weight ratios versus transmitter radii corresponding to various vehicle radii operating at 30 GHz.

TABLE 4

Minimum Thrust-To-Weight Ratios For Microwave-Powered Magnetically Accelerated Vehicles Operating At 30 GHz.
(n = 2 × 10$^{19}$ molecules/m$^3$, u$_0$ = 1,500 m/sec)

| Transmitter Radius | Minimum Thrust-To-Weight Ratios | | | |
|---|---|---|---|---|
| R$_t$(m) | R$_v$ = 25 m | R$_v$ = 50 m | R$_v$ = 100 m | R$_v$ = 150 m |
| 250 | 3.07 | 0.81 | 0.22 | 0.11 |
| 500 | 5.97 | 1.54 | 0.41 | 0.19 |
| 1000 | 11.76 | 2.99 | 0.77 | 0.35 |
| 1500 | 17.55 | 4.43 | 1.13 | 0.51 |
| 2000 | 23.34 | 5.88 | 1.49 | 0.67 |
| 2500 | 29.14 | 7.33 | 1.85 | 0.84 |
| 3000 | 34.93 | 8.78 | 2.22 | 1.00 |
| 3500 | 40.72 | 10.23 | 2.58 | 1.16 |
| 4000 | 46.51 | 11.68 | 2.94 | 1.32 |
| 4500 | 52.30 | 13.13 | 3.30 | 1.48 |
| 5000 | 58.10 | 14.58 | 3.66 | 1.64 |

The high thrust-to-weight ratios given in this table, and illustrated in FIG. 8, demonstrate that the propulsion system will be able to generate an upward accelerating force on large-diameter vehicles that is significantly greater than the vehicle's minimum structural weight $M_0$ g. This will enable the excess lifting force to be used for accelerating additional vehicle weight that is not used for supporting coil stress. And, since most of the ratios exceed 1.0 by a large margin, it will be possible to design the vehicles to carry enormous payload mass. This table, along with Tables 1 and 2, establish the basic engineering feasibility of the propulsion concept. Table 3 demonstrates that the propulsion system will be capable of achieving extremely low mass ratios. The minimum transmitter radii required to obtain initial thrust-to-weight ratios of 1.0 (at 125 km) for the vehicles having radii $R_v$=25 m, 50 m, 100 m, and 150 m, are 86 m, 343 m, 1,366 m, and 3,049 m, respectively. It will be relatively easy to construct phased array microwave transmitters horizontally on the earth's surface having these radii.

Table 5 gives the initial beam power $P_{max}$ (terrawatts) corresponding to the various transmitter and vehicle radii given in Table 4. The maximum power $P_{MAX}$ of the transmitter, which is equal to $\pi R_t^2 \rho_b$ (and hence independent of the vehicle radii), is also given in Table 5.

TABLE 5

Maximum Initial Beam Power Of Microwave Transmitters Accelerating Magnetically Propelled Vehicles Operating At 30 GHz.
($n = 2 \times 10^{19}$ mol/m$^3$, $u_0 = 1,500$ m/sec)

| Transmitter Radius | | Maximum Initial Beam Power $P_{max}$(TW) | | | |
|---|---|---|---|---|---|
| $R_t$(m) | $P_{MAX}$(TW) | $R_v = 25$ m | $R_v = 50$ m | $R_v = 100$ m | $R_v = 150$ m |
| 250 | 7.07 | 3.09 | 3.46 | 4.24 | 5.10 |
| 500 | 28.27 | 11.68 | 12.38 | 13.82 | 15.35 |
| 1000 | 113.10 | 45.37 | 46.73 | 49.50 | 52.36 |
| 1500 | 254.47 | 101.08 | 103.10 | 107.20 | 111.38 |
| 2000 | 452.39 | 178.81 | 181.50 | 186.92 | 192.43 |
| 2500 | 706.86 | 278.56 | 281.91 | 288.66 | 295.49 |
| 3000 | 1,017.88 | 400.33 | 404.34 | 412.42 | 420.58 |
| 3500 | 1,385.44 | 544.11 | 548.79 | 558.19 | 567.68 |
| 4000 | 1,809.56 | 709.92 | 715.25 | 725.99 | 736.80 |
| 4500 | 2,290.22 | 897.74 | 903.74 | 915.80 | 927.94 |
| 5000 | 2,827.43 | 1,107.58 | 1,114.24 | 1,127.63 | 1,141.10 |

This table demonstrates that for any given transmitter radii $R_t$, the maximum transmitted power $P_{max}$ increases very slowly with increasing vehicle radii $R_v$. Thus, the maximum power of the system is determined primarily by the diameter of the transmitter. For example, the maximum initial power $P_{max}$ that can be transmitted to a 50 m diameter vehicle using a 2,000 m diameter transmitter operating at 30 GHz is 45.37 TW. This power increases to only 46.73 TW if the vehicle diameter is doubled. But the payload of the larger vehicle will be almost twice that of the smaller. (It will be shown later that the payloads that these reusable vehicles could transfer to the Moon using the same 2,000 m diameter transmitter is 1,564 MT and 2,364 MT respectively. This is about equal to the total lunar payload transfer capability of 35 and 53 expendable Saturn Vs, respectively.)

One of the most important underlying design features of this vehicle acceleration concept is the fact by utilizing the principles of electronically-steered phased array microwave transmitters and superconducting energy storage systems, it will be relatively easy to construct a single-aperture transmitter capable of transmitting a coherent plane-polarized CW microwave beam of hundreds of terrawatts. It is only a matter of dimensions. Since there are many remote regions where large transmitters and underground superconducting energy storage systems can be constructed, virtually unlimited beam power can be achieved. By taking advantage of the economics of mass production, it will be very cost effective to construct transmitters with large dimensions. This is particularly true for superconducting energy storage systems since the cost of these systems is proportional to $E^{1/3}$ where E is equal to the stored energy capacity. (See, S. M. Schoenung and W. R. Meier, "A Comparison of Large-Scale Toroidal and Solenoidal SMES Systems," *IEEE Transactions On Magnetics*, Vol. 27, No. 2, March 1991, pp. 2324–2328, and R. J. Loyd et al, "An Overview Of The SMES ETV Program: The Bechtel Team's Perspective," *IEEE Transactions On Magnetics*, Vol. 25, No. 2, March 1989, pp. 1569–1575.).

By constructing the superconducting energy storage system with coils having radii on the order of 50 km or more, embedded deep underground on multiple levels, it will be possible to achieve a stored energy capacity exceeding $10^{J}$. The electrical energy needed to charge the superconducting energy storage coils could be obtained by compact automated radiatively-cooled MHD nuclear-electric generators. (See, Rosa, R. J., and Myrabo, L. N., "Ultra-Performance Closed-Cycle Gas Core Reactors For Orbit Raising," *Orbit-Raising and Maneuvering Propulsion*, Vol. 87, Progress in Astronautics and Aeronautics, 1984, pp. 460–476.) Since these generators could operate continuously over very long time periods using very little fuel, the cost of the electrical energy could be very low. (This cost could be reduced to almost zero by employing breeder reactions.) These MHD nuclear-electric generators would be ideal for remote desert areas. Excess electrical energy not needed for propulsion could be fed into a commercial power grid and sold to utility companies to generate additional income revenue. It is conceivable that such revenue could far exceed the cost of operating the space vehicles. This would open the possibility of providing commercial interplanetary space travel at essentially zero cost.

The electrical energy could also be generated photoelectrically by very large solar arrays covering several hundred square kilometers. However, it is conceivable that the most economical method for generating the electrical energy is by converting ambient heat energy (natural thermal energy) into mechanical work using my previous invention of closed-cycle cryogenic engines. These engines are designed by using a paramagnetic working fluid such as oxygen and extracting entropy magnetically by the principle of adiabatic demagnetization. (See my U.S. Pat. No. 5,040,373.)

Charging the energy storage coils would take place over relatively long time intervals (e.g., a few weeks). By discharging the coils over relatively short time intervals (30–60 minutes), the available output power could be several thousand times greater than the input power. This enables the superconducting energy storage system to be operated as a power amplifier.

If $T_{out}$ denotes the power out time interval (seconds) and E denotes the stored energy in the superconducting energy storage system, then the average available output power $P_{out}$ that could be extracted from the system can be expressed as $$P_{out} = \frac{E}{T_{out}}$$

An alternative equation for $P_{out}$ is $$P_{out} = (T_{in}/T_{out})P_{in}$$

where $P_{in}$ is equal to the input power over time interval $T_{in}$. For example, if $E = 2 \times 10^{18}$ J and $T_{out} = 3,600$ seconds (60 minutes), then $P_{out} = 555.56$ TW. Or, if $P_{in} = 50$ GW and $T_{in} = 2,000$ hour, $T_{out} = 0.5$ hour, then $P_{out} = 200$ TW.

Since this system enables large amounts of payload to be transported anywhere in the solar system, it would be possible to use the system to construct superconducting storage coils and microwave transmitters on other celestial bodies. This would enable magnetically propelled, reusable single-stage passenger-carrying vehicles to travel directly between the surfaces of celestial bodies at very high velocities, thereby providing a technically viable method for achieving low-cost interplanetary transportation necessary for commercial space travel and for colonizing the solar system.

The basic technology required to construct and use this method for accelerating large, single-stage vehicles to very high velocities operating directly between the surfaces of celestial bodies for future space travel already exists. It could provide the means for achieving commercial space travel, and on a scale previously believed to be far beyond technical possibility.

Having given a detailed mathematical description of the propulsion system and establishing its basic engineering feasibility, I shall now give a detailed construction of the preferred embodiment and a parametric performance analysis.

The streamlined, toroidal design of the vehicles used in this propulsion concept resemble a circular flying wing with a constant airfoil aspect ratio (length-to-thickness ratio) equal to approximately 8.0. FIG. 9 is a schematic horizontal cross-section through the vehicle's mid-plane illustrating its circular shape. FIG. 10 is an enlarged vertical cross-section through the airfoil illustrating the general design and construction of a passenger carrying vehicle containing a plurality of pressurized toroidal passenger cabins 34 rotating inside the vehicle. It is launched with the mid-plane parallel to the earth's surface. Since the vehicle's aspect ratio $\beta_v$ (length-to-diameter ratio) is relatively low, its height, while resting on the ground prior to launch, will be much lower than conventional launch vehicles. Consequently, it will be relatively easy to support the vehicle by a system of retractable legs 36 mounted 360° around the base. The ionizable gas 20 is ejected via a plurality of small nozzles 32.

By taking advantage of the vehicle's unique circular geometry, the launch propulsion system 38 can be designed to be extremely reliable. Instead of using many individual conventional rocket engines which would be difficult to operate and control simultaneously, the system is designed as a single linear motor with small curvature extending continuously, 360° around the end of the vehicle. (It is a linear motor having a length equal to the vehicle's mean circumference. See D. K. Huzel and D. H. Huang, *Modern Engineering For Design Of Liquid-Propellant Rocket Engines*, Vol. 147, Progress in Astronautics and Aeronautics, AIAA, 1992, p. 80) This will give the vehicle the potential for generating the enormous thrust (uniformly distributed) required for lifting any vehicle radius desired. Since the exhaust nozzle 40 of these motors is very short, it will provide an ideal rocket propulsion system for launching these circular vehicles. Because the vehicles are not very tall, the required thrust density (thrust per meter) will be well within the state-of-the-art for these motors. Steering control can be obtained by varying the rate of propellant flow around the motor to provide very accurate guidance along the ascent trajectory. This rocket propulsion system could also be utilized for guidance propulsion along interplanetary trajectories.

As is shown in FIG. 10, the superconducting propulsion solenoid 10 is mounted between the $LH_2/LO_2$ rocket propellant tanks 42 coaxially with the vehicle's central axis. The detailed design and construction is basically an enlarged version of the coils described in the articles: K. Arai et al, "Fiber-Reinforced-Superconductors with High-Elastic Modulus and Low Thermal Prestrain on $Nb_3Sn$ Layers for High-Field Pulsed Magnet," *IEEE Transactions On Magnetics*, Vol. 30, No. 4, July 1994, pp. 2164–2167, and V. E. Keilin et al, "Development of Superconducting Solenoids from Multifilamentary Niobiumn-Tin Wires Without Stabilizing Matrix and Analysis of their Thermal Stability," *Cryogenics*, Vol. 25, August 1985, pp. 462–465. The superconducting cable is designed to be stress-bearing similar to that described above. The vehicle's superstructure is designed to support the magnetic stress acting on the coil which tends to pull the coil apart and compress it into its mid-plane.

It was shown above that an ideal operating frequency selected for the microwave beam having low atmospheric absorption is 30 GHz. Consequently, in view of Table 2, the solenoid's maximum magnetic field strength $B_m$ corresponding to this frequency will be equal to 10.70 T. Since this is not a very high field, it will be relatively easy to design and construct the solenoid.

Referring to FIG. 10, the passengers are contained in one or more pressurized circular toroidal cabins 34 mounted above the solenoid 10. The cabins 34 are mounted inside toroidal superconducting shielding coils 44 that inhibit the magnetic field generated by the solenoid 10 from entering the interiors. The cabins 34 are rotated on their mounting structures to provide a centrifugally generated, artificial-gravity environment for the passengers. By gradually moving the floors in a direction perpendicular to the cabin's central axis, the artificial-gravity sensed by the passengers will always remain perpendicular to the floor under all vehicle acceleration loads. Since the artificial-gravity environment is generated by rotating the passenger cabins 34 inside the fuselage, the minimum radius of passenger-carrying vehicles should be about 50 m. Smaller radii would generate relatively large Coriolis forces that could cause disorientation and possible sickness.

To illustrate the passenger-carrying capability of relatively small vehicles designed for suborbital or lunar flights having only one passenger cabin, suppose the mean vehicle radius is 50 m. The length of a 0.07 aspect ratio solenoid would be 7 m. The vehicle's overall length (height while resting on the ground) would be about 25 m (82 ft.). The mean circumference of the passenger cabin would be about 314 m (1,031 ft.). Assuming that the passenger cabin has an inside diameter of 2.5 m to give four passengers per row seating, the vehicle could carry about 1,000 passengers. The same vehicle could be used for suborbital flights between cities, orbital flights to space stations orbiting the earth, or high-speed trips to the Moon. Larger vehicles, such as those described in FIG. 10, would be used for interplanetary flights. Thus, the traveling magnetic field propulsion system can be used to provide both efficient high-speed space travel through the solar system and high-speed travel between widely separated cities on the earth's surface. However, the application to space travel is more significant because it will make commercial space travel possible.

The rotating passenger cabins inside the vehicle will not only provide an artificial gravity environment for the passengers but it will also give the vehicle angular momentum. This angular momentum will prevent the vehicle from flipping over due to magnetic torque acting on the vehicle's solenoid by non-axial external magnetic fields. This is an important feature of the invention because it will also enable the vehicle to land and take off from a celestial body by magnetic repulsive forces generated by an external static magnetic field generated around the launch site instead of using rocket propulsion.

The magnetic moment vector M of a low aspect-ratio solenoid having a current i and mean radius R with N turns is given by $$M=NiAn$$

where A is equal to the enclosed area $\pi R^2$ and n is equal to the unit direction vector of A. If the coil is immersed in an external magnetic field B, the resulting magnetic torque t is $$\tau = M \times B$$

The magnitude of this torque vector is equal to $Ni\pi R^2 B \sin \epsilon$ where $\epsilon$ is equal to the angle between n and B.

In the numerical example given above, R=50 m. Consequently, since $B_m$=10.70 T, it follows from equation

(30) that the coil's total current $Ni=1.92\times10^8$ amps. If B is equal to the earth's natural magnetic field at the launch site where $B=0.00003$ T and $\epsilon=300$, the magnitude of the magnetic torque $\tau$ acting on the vehicle along the ascent trajectory will be about $1.404\times10^7$ Nm. By designing the polarity of the solenoid such that its field is repulsive with respect to the earth's natural field, this torque can be utilized to reduce the amount of chemical rocket propulsion required to reach the vacuum environment at 125 km.

If a sufficiently large superconducting solenoid is embedded underground around the launch site to create an artificial magnetic field, it will be possible to propel the vehicle to 125 km by magnetic repulsive forces instead of chemical rocket propulsion. Ordinarily, this possibility could never be achieved because the instability due to magnetic torque would flip the vehicle over immediately after it is released from the launch site. However, the rotation of the passenger cabins will give the vehicle a fairly large angular momentum. The effect of this angular momentum causes the vehicle to precess around the unit direction vector of the external magnetic field passing through the vehicle's center, making flipping impossible. This result is very important. It could be utilized for launching and landing the vehicles on other celestial bodies without rocket propulsion. This fact will now be demonstrated analytically.

Lifting a free-moving, current carrying coil, against the force of gravity, and accelerating it upward by magnetic repulsive forces generated by a fixed coaxial coil on the ground with opposite polarity, is believed to be fundamentally impossible because of the instability due to magnetic torque. As soon as the free-moving coil is released and begins to rise via magnetic repulsive forces, the magnetic torque will immediately flip the coil over, whereupon the repulsive force becomes attractive, forcing the coil back toward the fixed coil. In 1840 Earnshaw proved that this instability is intrinsic (i.e., it cannot be avoided) and is known as "Earnshaw's Theorem." (See, G. R. Polgreen, *New Applications of Modern Magnets*, MacDonald Pub. Co., London, 1966, p.261, and O. D. Kellogg, *Foundations of Potential Theory*, Frederick Ungar Pub. Co., New York, 1929, p. 83.) However, by giving the movable coil an axial angular momentum before it is released, the flipping motion can be converted into a precessional motion, enabling the coil to be continuously accelerated upward by magnetic repulsive forces without flipping over. As far as the Applacant knows, this is a new discovery made by the Applicant in 1993 which can be utilized for launching and landing circular vehicles equipped with superconducting solenoids on the surfaces of celestial bodies without rocket propulsion by means of conservative force fields. (See, *Space Travel By Microwave Generated Traveling Magnetic Fields*, Phaser Telepropulsion Inc., Technical Report No. 101–707, Feb. 21, 1994 by Michael A. Minovitch.)

The repulsive force F generated between two coaxial circular dipole coils having mean radii $R_1$ and $R_2$ with total currents $N_1$ $i_1$ and $N_2$ $i_2$ where $R_2<<R$, is given to a close approximation by equation (11) where h is equal to the separation distance between their mid-planes. By embedding a system of coaxial superconducting coils underground with very large radii, and charging them with current, it is possible to create an artificial static magnetic field with an intensity mnany times greater than the earth's natural magnetic field, extending upward several hundred kilometers. If a coil-carrying circular vehicle is placed coaxially at the center of this system, constrained, and charged with sufficient current, it is possible to generate an upward magnetic repulsive force greater than the downward force of gravity.

Consequently, when the vehicle is released, it will accelerate upward by means of a "force field" without using any rocket propulsion. Unfortunately, it will be impossible to maintain the vehicle's attitude such that its vertical axis will be precisely aligned along the direction of the external magnetic field vector B passing through its center. Thus, there will be some small error angle e. This error angle will generate magnetic torque c given by $\tau=N_2 i_2 \pi R_2^2 B$ sine which will, by necessity, be extremely large even for very small angles $\epsilon$. When the vehicle is released, it will accelerate upward a short distance, flip over, and accelerate downward. However, by giving the vehicle angular momentum, which can be generated by rotating a circular ring-like mass inside the vehicle (e.g.,toroidal payload bays or passenger cabins) or by rotating the entire vehicle by means of a rotating launching platform, the angular momentum will prevent the magnetic torque from flipping the vehicle over. This will enable the vehicle (with very large dimensions) to be catapulted through the open atmosphere at relatively low acceleration to very high altitudes by a static magnetic field acting over great distances. This represents a new propulsion concept that is very different from "electromagnetic accelerators" that can only accelerate small projectiles through a vacuum environment at very high acceleration.

If the stationary coils are sufficiently large this (static field) magnetic propulsion concept could be utilized in principle to achieve space travel without consuming any energy. The acceleration process is achieved by converting magnetic potential energy at the launch site into gravitational potential and kinetic energy, and the deceleration process is achieved by converting gravitational potential and kinetic energy back into magnetic potential energy at the landing site. Omitting the relatively minor effects of atmospheric drag, the conversion processes are conservative and no energy is lost. Thus, by giving the vehicle angular momentum prior to launch, it can be lifted off the surface and accelerated to escape velocities to another planet, decelerated, and landed by another repulsive magnetic field using the same process in reverse. Although a detailed investigation of this concept is beyond the intended scope of this disclosure, it is important to mention the possibility that it could be utilized very effectively on a smaller scale for launching and landing vehicles on celestial bodies without rocket propulsion in the present propulsion concept based on traveling repulsive magnetic fields. The same vehicle design can be used in both concepts. The key to this static field magnetic propulsion concept is the possibility of circumventing magnetic torque instability by angular momentum. This possibility will now be demonstrated analytically.

Let H denote the angular momentum of a circular vehicle with mean radius R at a launch site immersed in an external magnetic field. The external field is assumed to exert an upward magnetic repulsive force on the vehicle's superconducting solenoid greater than the force of gravity acting on the vehicle's mass. The external field is also assumed to have axial symmetry along the vertical axis which passes through the vehicle's center of mass and defines the vehicle's ascent trajectory. The coordinate system $\Sigma_0$ is assumed to be rectangular with origin centered at the vehicle's center of mass at the launch site.

If n denotes the direction of the rotation vector, designed to be as close to the vertical z axis as possible, H can be expressed as $H=I\omega n$         (34)

where I and ω) denote the moment of inertia and angular velocity of the rotating mass, respectively. Since the time rate of change of a body's angular momentum H is equal to the applied torque a, the basic equation of motion for the vehicle's angular momentum in an external magnetic field B is $$\frac{dH}{dt} = NiAn \times B \quad (35)$$

where A is equal to the vehicle's enclosed area $\pi R^2$ and Ni is equal to the solenoid's total current.

There is an important theorem in theoretical mechanics stating that the angular momentum about the center of mass of a rotating body is an invariant for all reference frames in relative translational motion. (See, J. L. Synge and B. A. Griffith, *Principles of Mechanics*, McGraw-Hill Book Co., Inc. New York, 1949, p. 330.) Consequently, since the ascent trajectory is defined as the vehicle's center of mass moving along the vertical axis of $\Sigma_0$, equations (34) and (35) remain valid with respect to a coordinate system E that is a parallel linear translation of $\Sigma_0$ with origin fixed at the vehicle's center of mass as it moves along the ascent trajectory. Therefore, upon substituting equation (34) into (35) and making use of the fact that B=Bk, the general equation for the vehicle's angular momentum along the ascent trajectory can be expressed as $$\frac{dH}{dt} = \Omega(H \times k) \quad (36)$$

where $$\Omega = \frac{NiAB}{I\omega} \quad (37)$$

Upon dot multiplying (36) by H, one obtains $$\frac{dH}{dt} \cdot H = \Omega(H \times k) \cdot H = 0$$

Hence, $$\frac{d}{dt}(H \cdot H) = 0$$

which implies that the magnitude of the vehicle's angular momentum H along the ascent trajectory is a constant $H_0$. Thus, in view of equation (34), it follows that the rate of rotation w along the ascent trajectory is a constant $\omega_0$.

In the ideal situation, the direction of rotation n is aligned precisely along the k axis prior to launch such that the angle between the vehicle's angular momentum H and the vertical axis k is 0. However, there will always be some error in the desired alignment. Let E denote this alignment error angle. Upon dot multiplying (36) by k, one obtains $$\frac{dH}{dt} \cdot k = \Omega(H \times k) \cdot k = 0$$

Hence, $$\frac{d}{dt}(H\cos\epsilon) = 0$$

which implies that the initial error angle ε between H and k at the moment of launch remains constant $\epsilon_0$ along the ascent trajectory. Thus, the angular momentum will prevent the magnetic torque from flipping the vehicle over.

In polar coordinates, n can be expressed as $$n=(\cos\phi\cos\theta, \cos\phi\sin\theta, \sin\phi)$$

where θ and φ are equal to the usual azimuth and elevation angles, respectively. Consequently, since $\phi=\pi/2-\epsilon_0=$ constant, $$n=(\sin\epsilon_0\cos\theta, \sin\epsilon_0\sin\theta, \cos\epsilon_0) \quad (38)$$

Since I and ω are constants, it follows from equations (34), (35), and (37) that $$\frac{dn}{dt} = \Omega n \times k$$

Consequently, when equation (38) is substituted into this equation, one finds $$\frac{d\theta}{dt} = -\Omega$$

giving a solution

Thus, the angular momentum vector H(t) rotates (precesses) around the magnetic field vector B at a rate ω given by equation (37) as the vehicle moves along the ascent trajectory. Since the thickness dimensions of the rotating ring-like mass (i.e., the passenger cabins and everything inside them) are small compared to R and is assumed to have a tufform mass distribution, the moment of inertia I about n is equal to $M_m R^2$ where $M_m$ is equal to its mass. (If the angular momentum is generated by rotating the entire vehicle, $M_m$ is equal to the vehicle's mass.) Consequently, this rate Ω can be expressed as $$\Omega = -\frac{\pi NiB}{M_m \omega_0} \quad (39)$$

Notice that this rate is independent of E. and R.

In summing up these results, we find that by rotating a uniform ring-like mass inside the vehicle about the central axis prior to launch to give the vehicle angular momentum, it will be possible to circumvent magnetic torque instability that would ordinarily flip the vehicle over after it is released. The repulsive magnetic field will lift the vehicle and accelerate it along the ascent trajectory to high velocities—an acceleration method previously believed to be quite impossible. The coupling between the vehicle's angular momentum and the magnetic torque causes the vehicle's axis n (the spin axis) to precess around the B vector at a rate Ω given by equation (39). The angle between n and B never exceeds the initial error angle $\epsilon_0$. Since the initial error angle can be very small (e.g., on the order of 0.02°), the precession around B, which is a small wobble, will be very small. The corresponding precession frequency $f_p$ (wobble frequency) is $$f_p = \frac{\Omega}{2\pi} = \frac{NiB}{2M_m\omega_0} \tag{40}$$

By employing a high-accuracy inertial guidance system, coupled to fast-acting attitude control thrusters, the wobbling effect could be dampened very quickly. (The error angle $\epsilon_0$ will be reduced to essentially zero by the torque generated by these attitude control thrusters.).

The initial angular velocity $\omega_0$ of the passenger cabins can be designed to generate a radial artificial-gravity environment equal to 1.0 $g_0$ (9.81 m/sec$^2$), which could be maintained throughout an entire voyage. In this case $$\omega_0 = \sqrt{\frac{g_0}{R}} \tag{41}$$

and the passengers inside the vehicle prior to launch would sense a combined gravitational and centrifugal force equal to $\sqrt{2}g_0$. After the magnetic propulsion is terminated and the vehicle begins its free-fall flight mode, the passengers would sense a normal earth-like gravity environment that would be essentially indistinguishable from a very smooth voyage on a large transatlantic ocean liner.

I shall now describe the detailed design and construction of the microwave power transmission system.

Although the construction of a CW beamed power steerable transmitter capable of generating several hundred terawatts at optical frequencies is well beyond technical feasibility, it can be achieved at microwave frequencies by constructing the transmitter horizontally on the earth's surface to obtain large dimensions and utilizing the principles of multiple-feed, electronically-steered phased arrays. (See, B. I. Hill, "High Power Tubes For Phased Array Applications," Ch. 3.2 in, Microwave Power Engineering, Vol. 2, E. C. Okress (ed.), Academic Press, New York, 1968, pp. 249–255, and N. A. Amitay et al, *Theory and Analysis of Phased Array Antennas*, Wiley-Interscience, New York, 1972.) This will enable virtually unlimited amounts of microwave power to be transmitted if sufficient electrical input power is available. The superconducting energy storage system will provide this input power.

Basically, the transmitter is constructed by joining individual radiating elements (e.g., beam launching horns) fed by microwave generators, phase shifters and waveguides all operating in parallel, to project a coherent plane-polarized microwave beam. The beam is steered electronically by the phase shifters which control the phase of each radiating element. It is possible to design the microwave feed system with low loss waveguides so that more than 98% of the microwave power fed into the system is transmitted.

The transmitting horns could have square transverse cross-sections with aperture dimensions $4\lambda$ by $4\lambda$. Hence, at 30 GHz, $\lambda$=0.01 m and the aperture dimensions of each element would be 4 cm×4 cm. The array could be mounted with $\lambda/2$ spacing to achieve a closely-packed array with negligible side lobes. This close-packing array design will enable more than 95% of the radiated power to be contained in the main lobe which forms the microwave beam. By mounting many of these elements in the form of 5 m by 5 m subarrays at the manufacturing plant, constructing an array having essentially any diameter desired could proceed by simply joining the subarrays on a horizontal mounting frame and connecting the power cables, control cables, and water cooling conduits. The cooling system could be provided by a grid of large-diameter underground water conduits constructed under the array fed by a large reservoir. A maximum power density of 3 KW/cm$^2$ would be more than sufficient to generate a coherent beam with very high quality having enormous power.

As described above, another reason why a large transmitter diameter is an important design feature involves atmospheric breakdown. By constructing the antenna with a large diameter, the flux (power density) of the beam passing through the atmosphere can be designed to be below the threshold where atmospheric breakdown occurs (between an altitude of 40 and 60 km). But, it will be capable of delivering a much higher power density at the vehicle several thousand kilometers above the atmosphere by focusing (see FIG. 5). By designing the microwave power generators to operate at variable power, the antenna's transmitted power density can be controlled to avoid atmospheric breakdown. The converging beam geometry enables the transmitted power to increase with increasing vehicle distance without increasing the power density at the breakdown altitude.

As in the design of the microwave transmitter, the underground superconducting energy storage system can be designed to store virtually unlimited amounts of energy by utilizing large dimensions. In order to eliminate any fringe field, which would extend over a very large region, the system will be designed as a collection of superconducting toroids where the magnetic fields are confined within their interiors. (See, S. M. Schoenting and W. R. Meier, "A Comparison of Large-Scale Toroidal and Solenoidal SMES Systems," *IEEE Transactions On Magnetics*, Vol. 27, No. 2, March 1991, pp. 2324–2328.) If all the coils are designed with the same minor radius, it will be possible to mass produce individual coil sections in a factory at low cost, and join them end-to-end inside the underground tunnels for rapid assembly.

Since the magnetic field B in a large diameter toroidal coil is constant, the stored inductive energy $E_i$ is equal to the magnetic energy density $B^2/2\mu_0$ times the volume of the toroid. Hence, if R and r denote the major and minor radii respectively, the stored inductive energy can be expressed as $$E_i = \frac{\pi^2 r^2 R B^2}{\mu_0} \tag{42}$$

By utilizing the surrounding tunnel walls to support the coil stress, it will be possible to design the system with relatively strong magnetic fields on the order of 20 T. (See, T. Kiyoshi et al, "Operation of a 20-T Superconducting Magnet with a Large Bore," *IEEE Transactions On Magnetics*, Vol. 30, No. 4, July 1994, pp. 2110–2113.)

A single coil with this field having dimensions R=50,000 m and r=25 m would be capable of storing $10^{17}$ Joules. A nested system having 10 or 20 such coils could easily exceed $10^{18}$ J, and this could be multiplied by an order of magnitude by employing deep tunnels with multiple levels. The tunnels could be bored by automated high-speed tunnel boring machines. Since the cost of large superconducting energy storage systems is proportional to $E^{1/3}$, it is very cost effective to design the system with large dimensions.

Since the inductive energy of the superconducting energy storage system is so great, it would be impractical to charge the coils using existing power plants. Therefore, the proposed magnetic propulsion system envisioned herein includes the construction of a large electric power generating system. This generating system could be photovoltaic solar arrays mounted around the transmitter covering a large area. A system covering an area of 2,000 km$^2$ could generate an average annual output of about 25 GW at latitude 40°. But this would be very expensive to construct. An alternative system could be based upon Rosa-type, nuclear-electric, gas-core, closed-cycle MHD generators. (See, R. J. Rosa and L. N. Myrabo, "Ultra-Performance Closed-Cycle Gas Core Reactors For Orbit Raising," *Orbit-Raising and Maneuvering Propulsion*, Vol. 87, Progress in Astronautics and Aeronautics, 1984, pp. 460–476, and I. Maya, "Ultrahigh Temperature Vapor-Core Reactor-Magnetohydrodynamic System for Space Nuclear Electric Power," Journal of Propulsion and Power, Vol. 9, No. 1, Jan.–Feb., 1993, pp. 98–104.) These generators have the advantage of operating at extremely high power densities and require relatively few moving parts. Compact automated units could be designed to operate continuously at 10 GW. They could be designed and installed underground as modular unites around the storage coils. Another advantage of using Rosa generators is that waste heat is expelled radiatively, which could be utilized as a high temperature heat reservoir for secondary power generating systems to boost the total output power. They would be ideal for remote desert areas and for generating electric power on other celestial bodies. They have very low specific mass. Since the propulsion system could eject radioactive waste products out of the solar system for disposal at very low cost, all of the problems associated with radioactive waste disposal from nuclear power generating plants would be eliminated. Thus, the true economic potential of nuclear-electric power generation—$ $10^{-4}$/KW-HR—could be realized. (Efficient hydroelectric generators can produce electrical energy at $10-^3$/KW-HR.) Excess electrical energy not used for propelling vehicles could be fed into a power grid and sold to commercial utility companies. The superconducting energy storage system could be utilized as a large load-leveling system. By generating large amounts of electrical power (e.g., 100 GW or more), the revenue received by the sale of unused electrical energy could far exceed the cost of operating the space vehicles.

It should also be pointed out that the electric power could also be generated by converting unlimited amounts of natural thermal energy into mechnical work to turn generators by using the Applicant's invention of closed-cycle cryogenic engines mentioned above. (See my U.S. Pat. No. 5,040,373 entitled "Condensing System And Operating Method" filed Oct. 27, 1989.) Since no radioactive materials are required, and since there is unlimited amounts of free natural thermal energy available, the cost of generating the electrical energy by this method would be virtually zero. However, since this system will require a considerable amount of research and development, it will be assumed that the electrical energy is generated by nuclear generators with a cost of $10^{-4}$/KW-HR.

I shall now present a detailed parametric performance analysis of the invention. This analysis is based on a system operating at a frequency of 30 GHz. The number density n of the ejected argon gas cloud is $2 \times 10^{19}$ molecules/r$^3$ and the axial velocity $u_0 = 1,500$ m/sec.

The maximum payload mass $M_{pay}$ is given by $$M_{pay} = (R_{tw} - 1) M_0 \quad (43)$$

where $R_{tw}$ is equal to the vehicle's thrust-to-weight ratio. The thrust-to-weight ratios corresponding to various transmitter and vehicle radii were given above in Table 4. It is assumed for definiteness that the vehicle's empty mass $M_0 = 2M_s$ where $M_s$ is equal to the vehicle's minimum structural mass given by equation (6). It should be emphasized that the value of $M_0 = 2M_s$ is rather arbitrary and may not be very accurate. Assigning a numerical value to $M_0$ is used primarily for investigating the performance scaling laws corresponding to various vehicle/transmitter combinations.

Table 6, given below, gives the maximum payload mass corresponding to four vehicle radii $R_v$ and various transmitter radii $R_t$. The transmitter is assumed to operate at maximum power $P_{max}$ given by equation (24).

TABLE 6

Maximum Payload Mass $M_{pay}$(kg) For Magnetically-Accelerated Vehicles Operating At 30 GHz.
(n = 2 × 10$^{19}$ molecules/m$^3$, $u_n$ = 1,500 m/sec, $M_n$ = 2$M_s$)

| Transmitter Radius | Maximum Payload Mass $M_{pay}$(kg) | | | |
|---|---|---|---|---|
| $R_t$(m) | $R_v$ = 25 m | $R_v$ = 50 m | $R_v$ = 100 m | $R_v$ = 150 m |
| 250 | 3.32 × 10$^5$ | 0 | 0 | 0 |
| 500 | 7.98 × 10$^5$ | 9.93 × 10$^5$ | 0 | 0 |
| 1000 | 1.73 × 10$^6$ | 2.56 × 10$^6$ | 0 | 0 |
| 1500 | 2.66 × 10$^6$ | 4.40 × 10$^6$ | 1.34 × 10$^6$ | 0 |
| 2000 | 3.59 × 10$^6$ | 6.27 × 10$^6$ | 5.04 × 10$^6$ | 0 |
| 2500 | 4.52 × 10$^6$ | 8.13 × 10$^6$ | 8.74 × 10$^6$ | 0 |
| 3000 | 5.45 × 10$^6$ | 9.99 × 10$^6$ | 1.25 × 10$^7$ | 0 |
| 3500 | 6.38 × 10$^6$ | 1.19 × 10$^7$ | 1.62 × 10$^7$ | 5.54 × 10$^6$ |
| 4000 | 7.31 × 10$^6$ | 1.37 × 10$^7$ | 1.99 × 10$^7$ | 1.11 × 10$^7$ |
| 4500 | 8.24 × 10$^6$ | 1.56 × 10$^7$ | 2.36 × 10$^7$ | 1.66 × 10$^7$ |
| 5000 | 9.17 × 10$^6$ | 1.74 × 10$^7$ | 2.73 × 10$^7$ | 2.21 × 10$^7$ |

Vehicles with radii equal to 25 m described in Table 6 should be regarded as small unmanned cargo carrying vehicles. However, as is shown in this Table, even these vehicles will be capable of carrying payloads many times greater then that of the largest launch vehicles ever constructed.

The maximum full-power transmission distance $D_{max}$ that can be achieved by focusing a phased array microwave transmitter with aperture diameter $D_t$ onto a vehicle with diameter $D_v$ is approximately $$D_{max} = \frac{D_v D_t}{\lambda} \quad (44)$$

Table 7 gives these distances corresponding to the various vehicle/transmitter radii combinations given in Table 6.

TABLE 7

Full-Power Transmission Distances $D_{max}$(km) For Magnetically-Accelerated Vehicles Operating At A Frequency Of 30 GHz.
($\lambda$ = 0.01 m)

| Transmitter Radius | Full Power Transmission Distance (km) | | | |
|---|---|---|---|---|
| $R_t$(m) | $R_v$ = 25 m | $R_v$ = 50 m | $R_v$ = 100 m | $R_v$ = 150 m |
| 250 | 2,500 | 5,000 | 10,000 | 15,000 |
| 500 | 5,000 | 10,000 | 20,000 | 30,000 |
| 1000 | 10,000 | 20,000 | 40,000 | 60,000 |
| 1500 | 15,000 | 30,000 | 60,000 | 90,000 |
| 2000 | 20,000 | 40,000 | 80,000 | 120,000 |
| 2500 | 25,000 | 50,000 | 100,000 | 150,000 |
| 3000 | 30,000 | 60,000 | 120,000 | 180,000 |
| 3500 | 35,000 | 70,000 | 140,000 | 210,000 |
| 4000 | 40,000 | 80,000 | 160,000 | 240,000 |
| 4500 | 45,000 | 90,000 | 180,000 | 270,000 |
| 5000 | 50,000 | 100,000 | 200,000 | 300,000 |

Although the distances given in Table 7 are only approximations of the full-power range of the system, it should be pointed out that since the cost of the electrical energy is so cheap, operating at nearly 100% power transfer efficiency is not very important. It will not effect the mass ratios. However, the performance analysis will be based upon operating the system within these distances, which, for definiteness, will be assumed to be 100% efficient. (See, K. Chang et al, "Feasibility Study of 35 GHz Microwave Power Transmission in Space," Space Power, Vol. 8, No. 3, 1989, pp. 365–370.)

In order to calculate the total mass ratios of this vehicle propulsion system corresponding to various missions it is necessary to determine the mass ratios of the launch and return trajectories to and from the minimum magnetic propulsion altitude of 125 km where conventional chemical rocket propulsion is used.

Numerical simulations of high inclination launch trajectories using high-accuracy atmospheric models and various vehicle radii with drag coefficients equal to 0.08 (corresponding to streamlined airfoil chord-to thickness ratios equal to 8 to 1) indicate that the effects of atmospheric drag can be canceled by assuming a constant acceleration of gravity equal to 9.83 msec$^2$. This approximation becomes very accurate for vertical launch trajectories. It will be shown that in this case, the launch trajectories are independent of the vehicle's size or mass, and are completely determined by only one independent variable.

The rocket propulsive thrust $F_t$ is assumed to be constant given by the equation $$F_t = \dot{M}C \tag{45}$$

where $\dot{M}$ is equal to the propellant rate of mass flow and c is equal to the exhaust velocity. Assuming a vertical launch trajectory, the engine thrust is terminated when the vehicle reaches some intermediate altitude $h_1$, after which the vehicle coasts ballistically to 125 km. Omitting atmospheric drag, the differential equation of motion during the propulsive thrust is $$M\frac{dv}{dt} = F_t - Mg \tag{46}$$

where M is equal to the vehicle's instantaneous mass. If $M_1$ and $M_2$ denote the vehicle's initial and burn-out mass, respectively, the propulsion time interval $T_1$ can be expressed by $$T_1 = \frac{M_1 - M_2}{\dot{M}}$$

The maximum upward acceleration $a_m$ at the cut-off altitude $h_1$ is $$a_m = \frac{\dot{M}c}{M_2} - g$$

If $a_m$ and the mass ratio $M_1/M_2$ are given as independent variables, the time interval $T_1$ can be expressed as $$T_1 = \left(\frac{M_1}{M_2} - 1\right)\left(\frac{c}{a_m + g}\right) \tag{47}$$

The burn-out velocity $v_1$ at $h=h_1$, obtained by solving equation (46), is $$v_1 = c\log\left(\frac{M_1}{M_2}\right) - gT_1 \tag{48}$$

Consequently, we obtain $$h_1 = cT_1 - \frac{c^2}{a_m + g}\log\left(\frac{M_1}{M_2}\right) - \frac{gT_1^2}{2} \tag{49}$$

If $h_2$ and $T_2$ denote the coasting distance and coasting time, respectively, these parameters are given by $$h_2 = \frac{v_1^2}{2g}$$

and $$T_2 = \left(\frac{2h_2}{g}\right)^{1/2}$$

By setting $h_1+h_2=125,000$ m, the number of independent variables is reduced to one. Table 8 gives the mass ratios corresponding to various values of $a_m$ which is selected to be the independent variable. The calculations are based upon an exhaust velocity c=4,606 m/sec (LH$_2$/LO$_2$, Isp=470 sec).

TABLE 8

Mass Ratios of Rocket Propelled Vertical Launch Trajectories To 125 km Corresponding To Various Maximum Accelerations $a_m$(g) (Isp = 470 sec)

| $a_m$(g) | $M_1/M_2$ | $h_1$(m) | $v_1$(m/sec) | $T_1$(sec) | $h_2$(m) | $T_2$(sec) | $T_1 + T_2$ |
|---|---|---|---|---|---|---|---|
| 1.5 | 1.6811 | 59,423 | 1,135.5 | 127.90 | 65,578 | 115.51 | 243.41 |
| 2.0 | 1.5871 | 48,754 | 1,224.4 | 91.89 | 76,249 | 124.55 | 216.44 |
| 2.5 | 1.5430 | 41,445 | 1,281.7 | 72.86 | 83,554 | 130.39 | 203.24 |
| 3.0 | 1.5167 | 36,078 | 1,322.2 | 60.67 | 88,926 | 134.51 | 195.67 |
| 3.5 | 1.4990 | 31,955 | 1,352.5 | 52.08 | 93,049 | 137.59 | 189.67 |
| ∞ | 1.4054 | 0 | 1,567.7 | 0 | 125,000 | 159.48 | 159.48 |

In reviewing this Table, one finds that a launch trajectory corresponding to a low maximum acceleration of 2.0 g requires a mass ratio of only 1.5871. The trajectory is much slower than conventional launch vehicles and could be easily tolerated by ordinary passengers. However, the most important parameter is mass ratio.

High-speed vehicles returning to earth are initially decelerated by the traveling repulsive magnetic field. The deceleration is designed to reduce the vehicle's approach velocity to zero at an altitude of 125 km above the landing site. Local weather conditions will determine the precise cut-off point. After this is accomplished, the vehicles proceed by slowly free-falling into the atmosphere. Consequently, the reentry velocity is very low.

The unique toroidal design of the vehicles can be utilized very effectively for atmospheric braking prior to landing. As is shown in FIG. 11, this is accomplished by deploying a thin flexible hemispherical cap 46 across the upper end of the vehicle 12 made of high-strength Kevlar immediately after it is initially decelerated to zero velocity by the traveling magnetic field at an altitude of 125 km.

The deployment system comprises a semi-circular beam 48 that extends 180° around the vehicle's forward end. The Kevlar sheet is stored on this beam in the form of a roll 50. Each end of the beam is mounted on a swivel mechanism 52 aligned along an axis that is perpendicular to the vehicle's central axis. The sheet is deployed by rotating the beam 180° about this axis, and securing it to the vehicle 12. As is illustrated in FIG. 11, the entire vehicle is converted into a very large parachute. The resulting drag force $F_d$ is $$F_d = \tfrac{1}{2} C_d \rho \pi R^2 V^2 \quad (50)$$

where $C_d$, $\rho$, and V are equal to the drag coefficient, air density and vehicle velocity, respectively. The resulting aerodynamic deceleration is so effective, the terminal approach velocity a few meters above the landing site, is very low even for extremely massive vehicles. This approach velocity is $$V_a = \left(\frac{2Mg}{C_d \rho \pi R^2}\right)^{1/2} \quad (51)$$

which is obtained from equation (50) by setting $F_d = Mg$ (the gravitational force). The drag coefficient $C_d$ can be taken to be 2.4, which is typical for concave surfaces such as parachutes. (See, A. W. Sherwood, *Aerodynamics*, McGraw-Hill Book Co., Inc., New York, 1949, pp. 105–107.) The terminal retro rocket propulsion begins a few meters above the landing site and is designed to reduce the vehicle velocity to zero at touchdown. The corresponding minimum mass ratio $M/M_0$ is $$M/M_0 \exp(V_a/c) \quad (52)$$

A detailed numerical integration of the equation of motion (46) through the atmosphere was carried out for each of the vehicles described above using a high-accuracy, density versus altitude function for the atmosphere. In this case $F_t = F_d$, and the gravitational acceleration g is the well-known decreasing function of altitude h given by $$g = \frac{G_e}{(R_e + h)^2} \quad (53)$$

where $G_C$ is equal to the earth's gravitational constant $3.981 \times 10^{14}$ m$^3$/sec$^2$, and $R_e$ is equal to the earth's mean radius 6,371,315 m. The important trajectory parameters determined were: maximum aerodynamic deceleration $a_m$ at altitude $H_m$, velocity $V_m$, and time $T_m$; the total free-fall time $T_t$ through the atmosphere from an altitude of 125 km; the terminal approach velocity $V_a$ where the retro rocket propulsion begins at altitude $H_1$ and duration $T_2$. The actual mass ratios $M/M_0$ corresponding to the terminal retro rocket propulsion were also determined. The touchdown vehicle mass was taken to be equal to the empty vehicle mass $M_0 = 2M_s$. The elevation of the landing site was assumed to be 1,400 m. The retro rocket deceleration was taken to be equal to 1.5 g. An infinite retro rocket deceleration corresponds to the minimum mass ratio given by equation (52). The results are given in Table 9.

TABLE 9

Flight Parameters of Circular Vehicles Free-Falling From 125 km Corresponding to Various Radii With Atmospheric Braking and Terminal Retro Rocket Propulsion.
(c = 4,606 m/sec, Isp == 470 sec)

| Trajectory Parameters | Vehicle Radius | | | |
|---|---|---|---|---|
| | $R_v$ = 25 m | $R_v$ = 50 m | $R_v$ = 100 m | $R_v$ = 150 m |
| $a_m$(g) | 4.19 | 4.44 | 4.69 | 4.83 |
| $H_m$(km) | 37.14 | 32.50 | 27.84 | 25.13 |
| $V_m$(m/sec) | 744.91 | 766.36 | 787.39 | 799.95 |
| $T_m$(sec) | 139.68 | 143.10 | 146.44 | 148.37 |
| $H_1$(m) | 35.70 | 71.70 | 144.20 | 216.80 |
| $T_1$(sec) | 683.80 | 505.90 | 380.75 | 326.13 |
| $V_a$(m/sec) | 25.42 | 36.09 | 51.41 | 63.27 |
| $T_2$(sec) | 3.29 | 4.75 | 6.65 | 8.16 |
| $T_1 + T_2$ | 687.09 | 510.65 | 387.40 | 334.29 |
| $M_1/M_0$ | 1.0106 | 1.0154 | 1.0217 | 1.0268 |

The energy efficiency and operating cost of this traveling field magnetic propulsion concept can be determined by introducing a parameter which will be called the specific launch energy. It will be defined as the total microwave energy E transmitted to magnetically accelerate a vehicle during a time interval T equal to $$E = \int_0^T P \, dt$$

divided by the vehicle's total payload mass MP expressed as $E/M_p$. Since the electric-to-microwave D conversion efficiency is nearly 100%, this parameter is essentially equal to the electrical energy used to accelerate a unit mass of payload. It is therefore a good measure of the vehicle's energy efficiency. For suborbital flights, the amount of energy used to magnetically decelerate a vehicle above the landing site is approximately equal to E. Consequently, if the specific electrical energy production cost Ce ($/KW-HR) of the energy generation system is known, the electrical energy cost of a suborbital flight can be determined by multiplying this rate by 2E. Since the vehicles are single-stage and reusable, this cost is a good measure of the vehicle's flight cost. Omitting the cost of ware and maintenance, the total operating cost of a vehicle flight is equal to the cost of the electrical energy used by the transmitters and the cost of the $L_2/LO_2$ chemical rocket propellant. The Lq/Lq propellant is manufactured using this electrical energy. Since the cost of the electrical energy is so low ($10$^{-4}$/KW-HR), the propellant cost will be negligible. Consequently, the total cost of a suborbital flight can be expressed as 2EC, and the cost of transporting a unit mass of payload in the vehicle will be $2(E/M_p)C_e$. If the mass of a passenger is denoted by $m_p$, the transportation cost would be $2(E/M_p)m_pC_e$. Since flights to orbiting space stations do not require any deceleration, the passenger cost is expressed as $(E/M_p)m_pC_e$. For trips to the Moon and other celestial bodies, the passenger cost is approximately $2(E/M_p)m_pC_e$ where, for simplicity, it is assumed that the energy production cost is essentially equal to the cost of the fissionable material used in the electric generating system. (Since the amount of fissionable fuel consumed in nuclear-electric generators is very small, its transportation cost to other celestial bodies is negligible.).

The determination of accurate magnetically accelerated vehicle trajectories requires a numerical integration of the equation of motion (46). In this case, the vehicle thrust $F_t$ (which begins at time $T_3$ when the vehicle reaches an altitude of 125 km with mass $M_1$), is given by equation (17) where the instantaneous vehicle mass $M=M_2-\dot{m}(t-T_3)$. The gravitational acceleration g is given by equation (53). The thrust vector is designed to be tangent to the vehicle's flight path.

The system will operate at maximum efficiency if the magnetic propulsion occurs within the fill power transmission range of the transmitter. (These distances are given in Table 7.) The magnetic propulsion is terminated when the vehicle goes beyond the full power transmission range.

The first application of the magnetic propulsion system considered in the performance analysis will involve suborbital flights between widely separated cities of the earth's surface. Table 10 gives the maximum payload $M_p(MT)$, maximum altitude $H_{max}(km)$, total mass ratio $R_t$, total flight time TFT(hr), and the specific launch energy $E/M_p(J/kg)$ corresponding to suborbital flights between cities separated by 16,094 km (10,000 miles) for various vehicle and transmitter radii. FIG. 12 illustrates a typical suborbital trajectory 54 between two widely separated cities 56.

For definiteness, it will be assumed that the maximum acceleration $a_m$ of the rocket propelled launch trajectory to 125 km is 2.0 g (19.620 m/sec$^2$). Consequently, in view of Table 8, the corresponding mass ratio $R_{01}$ of this portion of the flight will be 1.5871. The maximum magnetic acceleration and deceleration $a_m$ will be assumed to be 1.5 g (14.715 m/sec$^2$). The corresponding mass ratio $R_{12}$ and $R_{23}$ for these portions of the flight will range between 1.0010 and 1.0096. The mass ratio $R_{34}$ of the retro rocket landing trajectories given in Table 9 will range between 1.0154 and 1.0217. Consequently, the total mass ratios $R_t=R_{01}xR_{12}R_{23}xR_{34}$ corresponding to these suborbital flights ranges between 1.615 and 1.643.

The significance of this Table becomes more apparent when one compares the results with the performance capabilities of advanced long-range commercial airliners such as the 747SP (superperformance). These aircraft (with a gross mass of about 300 MT) have a maximum range of about 10,000 miles, burn 145 MT of fuel, and require flight times of 17.4 hours. The corresponding payload for this distance is about 13 MT and the mass ratio is approximately 1.94. (See, R. Redding and B. Yenne, *Boeing: Planemaker to the World*, Crescent Books, 1983, pp. 202, 203.) Table 10 shows that a 1000 m diameter microwave transmitter, which could be constructed near a large airport, could accelerate a 100 m diameter vehicle with 30 times more payload, carrying 1,000 passengers over the same distance utilizing a suborbital trajectory in less than two hours. Deceleration is accomplished by a similar transmitter located at the landing site, and atmospheric breaking. The total mass ratio is only 1.643. Assuming that the nuclear-electric generating system operates at $10^{-4}$/KW-HR, the cost of the electrical energy used for acceleration and deceleration is $1.32/kg. Consequently, if the average passenger mass is 100 kg, the per passenger cost of the flight would be about $264.

Table 11 gives the payload mass $M_p$, total mass ratio $R_t$, total flight time TFT, and the specific launch energy $E/M_p$ for flights to the Moon with various vehicle/transmitter combinations. For these flights (and all interplanetary flights), the magnetic acceleration trajectories can be assumed to be a continuation of the vertical launch trajectory. In view of the high approach velocities, it can be assumed that the vehicles approach the lunar landing site along a vertical trajectory and decelerated by a microwave transmitter having sufficient power. Since there is no atmosphere on the Moon, the microwave transmitter could operate at much higher power densities. The power is gradually increased to take into consideration the increasing limar gravity so that the deceleration is constant and equal to 1.5 g (14.715 m/sec$^2$). The deceleration is designed to slow the vehicle to zero velocity one or two kilometers above the landing site. The landing deceleration could be accomplished by retro rocket propulsion, or by magnetic repulsive forces generated by a superconducting solenoid constructed around the landing site, or by a combination of these two methods. The trajectory calculations were carried out by numerically integrating the equation of motion (46) where the vehicle moves continuously under the influence of the earth and Moon acting simultaneously. (The reason why most of the payloads MP given in Table 11 are greater than the corresponding values given in Table 10, is due to the fact

TABLE 10

Payload $M_p$(MT), Maximum Altitude $H_{max}$(km), Total Mass Ratio $R_t$, Total Flight Time TFT(hr) and Specific Launch Energy $E/M_p$(J/kg) of Suborbital Flights Between Cities on the Earth's Surface. (Separation Distance = 10,000 miles)

| $R_t$ | $R_v$ = 50 m | | | | | $R_v$ = 100 m | | | | |
|---|---|---|---|---|---|---|---|---|---|---|
| (km) | $M_p$ | $H_{max}$ | $R_t$ | TFT | $E/M_p$ | $M_p$ | $H_{max}$ | $R_t$ | TFT | $E/M_p$ |
| 500 | 433 | 4,389 | 1.643 | 1.65 | 4.74E10 | — | — | — | — | — |
| 1000 | 2,125 | 5,218 | 1.627 | 1.78 | 3.88E10 | — | — | — | — | — |
| 1500 | 3,802 | 5,701 | 1.622 | 1.86 | 4.88E10 | 19 | 4,807 | 1.642 | 1.71 | 9.66E12 |
| 2000 | 5,478 | 5,973 | 1.619 | 1.90 | 6.02E10 | 3,386 | 5,218 | 1.637 | 1.78 | 9.75E10 |
| 2500 | 7,154 | 6,155 | 1.618 | 1.93 | 7.20E10 | 6,746 | 5,496 | 1.634 | 1.82 | 7.64E10 |
| 3000 | 8,829 | 6,274 | 1.617 | 1.95 | 8.41E10 | 10,103 | 5,701 | 1.632 | 1.85 | 7.35E10 |
| 3500 | 10,505 | 6,366 | 1.616 | 1.97 | 9.62E10 | 13,458 | 5,853 | 1.631 | 1.88 | 7.51E10 |
| 4000 | 12,181 | 6,439 | 1.615 | 1.98 | 1.08E11 | 16,812 | 5,973 | 1.629 | 1.90 | 7.85E10 |
| 4500 | 13,855 | 6,498 | 1.615 | 1.99 | 1.21E11 | 20,165 | 6,072 | 1.629 | 1.92 | 8.28E10 |
| 5000 | 15,531 | 6,541 | 1.615 | 2.00 | 1.33E11 | 23,517 | 6,152 | 1.628 | 1.93 | 8.77E10 | that the beam elevation angles corresponding to the suborbital trajectories in Table 10 are not 90.°)

be transported from the earth. Since the mass ratios of the magnetic propulsion system are so low, the maximum pay-

TABLE 11

Payload $M_p$(MT), Total Mass Ratio $R_t$, Total Flight Time TFT(hr) and Specific Launch Energy $E/M_p$(J/kg) of Magnetically-Accelerated Vehicles to the Moon

| $R_t$ | $R_v = 25$ m | | | | $R_v = 50$ m | | | | $R_v = 100$ m | | | |
|---|---|---|---|---|---|---|---|---|---|---|---|---|
| (m) | $M_p$ | $R_t$ | TFT | $E/M_p$ | $M_p$ | $R_t$ | TFT | $E/M_p$ | $M_p$ | $R_t$ | TFT | $E/M_p$ |
| 500 | 621 | 1.61 | 14.59 | 4.44E10 | 430 | 1.65 | 7.86 | 9.92E10 | — | — | — | — |
| 1000 | 1,564 | 1.60 | 7.86 | 1.09E11 | 2,364 | 1.63 | 5.43 | 1.16E11 | — | — | — | — |
| 1500 | 2,533 | 1.60 | 6.24 | 1.91E11 | 4,301 | 1.63 | 4.65 | 1.63E11 | 918 | 1.68 | 4.08 | 9.60E11 |
| 2000 | 3,503 | 1.60 | 5.45 | 2.87E11 | 6,180 | 1.62 | 4.66 | 2.18E11 | 4,664 | 1.66 | 4.29 | 3.15E11 |
| 2500 | 4,473 | 1.60 | 4.98 | 3.99E11 | 8,042 | 1.61 | 4.74 | 2.58E11 | 8,398 | 1.64 | 4.44 | 2.63E11 |
| 3000 | 5,427 | 1.60 | 4.94 | 5.38E11 | 9,903 | 1.61 | 4.80 | 2.30E11 | 12,126 | 1.63 | 4.54 | 2.57E11 |
| 3500 | 6,357 | 1.60 | 4.96 | 6.25E11 | 11,763 | 1.61 | 4.84 | 3.41E11 | 15,852 | 1.62 | 4.62 | 2.63E11 |
| 4000 | 7,287 | 1.60 | 4.98 | 7.12E11 | 13,624 | 1.60 | 4.87 | 3.84E11 | 19,576 | 1.62 | 4.66 | 2.75E11 |
| 4500 | 8,218 | 1.59 | 4.99 | 7.99E11 | 15,485 | 1.60 | 4.89 | 4.26E11 | 23,300 | 1.62 | 4.71 | 2.91E11 |
| 5000 | 9,148 | 1.59 | 5.00 | 8.86E11 | 17,345 | 1.60 | 4.91 | 4.69E11 | 27,022 | 1.61 | 4.74 | 3.07E11 |

The most remarkable characteristic of the passenger-carrying flights to the Moon described in Table 11 is the short flight times and low mass ratios. They are actually lower than those of long-range commercial airliners traveling between two widely seperated cities. This is the key operating characteristic of the present invention that will make commercial space travel possible. The Table shows that a 1,000 m diameter transmitter could accelerate the same 100 m diameter vehicle used for suborbital flights, all the way to the Moon in only 7.86 hours, which is less than half the 17.4 hours of flight time required for a 747SP to travel 10,000 miles. And, the vehicle could carry 1,000 passengers at a cost of about $500/passenger. Since the flight times are so short, the same vehicles used for suborbital flights could be used for trips to the Moon (or trips to orbiting space stations) essentially without any modification. Since the electric generating system could produce electrical energy so cheaply, the cost of the launch energy could be recovered by the sale of excess power to utility companies. Thus, the actual operating cost of the vehicles would be very low. Moreover, since the cost of operating the propulsion system could be substantially less than the revenue received from the sale of excess electrical energy to utility companies, the passenger cost could be set at any level—even zero—and the system could still operate at a profit.

In order to construct the magnetic propulsion system on the Moon's surface, large quantities of cargo would have to loads that could be delivered by each vehicle/transmitter combination are close to those given in Table 5. When the vehicle approaches the Moon, the cargo is removed in modules and landed independently via retro rocket propulsion while the vehicle swings around the Moon and returns to earth on a low-energy, non-stop, free-fall, round-trip trajectory. Transmitting systems could be constructed on other celestial bodies by delivering the components using the same method.

Table 12 gives the maximum payload mass $M_p$(MT) that the vehicles could transport to Mars on free-fall, round-trip, interplanetary trajectories with hyperbolic excess velocity equal to 3.5 km/sec. The total mass ratios R, and the corresponding specific launch energies $E/M_p$(J/kg) are also given. Since the vehicles are carrying cargo with few passengers, the maximum acceleration $a_m$ of the rocket propelled launch trajectory can be taken to be 3.5 g so that the corresponding mass ratio $R_{01}=1.499$. By taking advantage of atmospheric breaking at Mars using very large parachutes, a fairly large fraction of the payload mass $M_p$ could be useful cargo.

TABLE 12

Payload $M_p$(MT), Total Mass Ratio $R_t$, and Specific Launch Energy $E/M_p$(J/kg) of Magnetically-Accelerated Vehicles to Mars. (V = 3.500 km/sec)

| | $R_v = 25$ m | | | $R_v = 50$ m | | | $R_v = 100$ m | | |
|---|---|---|---|---|---|---|---|---|---|
| $R_t$ | $M_p$ | $R_t$ | $E/M_p$ | $M_p$ | $R_t$ | $E/M_p$ | $M_p$ | $R_t$ | $E/M_p$ |
| 500 | 786 | 1.54 | 5.57E10 | 611E10 | 1.58 | 7.32E10 | — | — | — |
| 1000 | 1,717 | 1.53 | 1.02E11 | 2,483 | 1.55 | 7.06E10 | — | — | — |
| 1500 | 2,648 | 1.53 | 1.50E11 | 4,347 | 1.54 | 9.06E10 | 1,044 | 1.57 | 3.79E11 |
| 2000 | 3,578 | 1.52 | 1.99E11 | 6,210 | 1.54 | 1.13E11 | 4,795 | 1.56 | 1.46E11 |
| 2500 | 4,509 | 1.52 | 2.48E11 | 8,072 | 1.53 | 1.36E11 | 8,535 | 1.56 | 1.28E11 |
| 3000 | 5,439 | 1.52 | 2.97E11 | 9,934 | 1.53 | 1.60E11 | 12,227 | 1.55 | 1.28E11 |
| 3500 | 6,370 | 1.52 | 3.47E11 | 11,795 | 1.53 | 1.84E11 | 15,999 | 1.55 | 1.34E11 |
| 4000 | 7,301 | 1.52 | 3.97E11 | 13,657 | 1.53 | 2.08E11 | 19,727 | 1.55 | 1.42E11 |
| 4500 | 8,231 | 1.52 | 4.48E11 | 15,552 | 1.53 | 2.33E11 | 23,454 | 1.55 | 1.52E11 |
| 5000 | 9,162 | 1.52 | 4.98E11 | 17,380 | 1.53 | 2.57E11 | 27,180 | 1.54 | 1.62E11 |

This Table shows that a 200 m diameter vehicle, magnetically accelerated by a 10,000 m diameter transmitter, could transport a 27,180 MT payload to Mars at a cost of about $4.50/kg. This is less than the cost of transatlantic air cargo. The corresponding mass ratios are $R_{01}=1.499$, $R_{12}=$ 1.0044, $R_{23}$=1.0044, $R_{34}$=1.0154. Assuming that the vehicle returns to the launch site empty with a mass $M_0$=2$M_s$=10, 280 MT, the initial launch mass $M_{01}$=$R_{01}R_{12}$ [$R_{23}R_{34}M_0$+ $M_p$]=56,707 MT.

A convoy of these vehicles could transport so much cargo, that a low-power magnetic propulsion system could probably be constructed in less than 10 years. This would enable vehicles to land and take off directly from the surface of Mars so that all the payload would be useful cargo. The initial system could then be rapidly expanded to fill size in a few years.

After sufficiently large microwave power transmitting systems are constructed on suitable celestial bodies in the solar system, it will be possible to travel between these bodies at very high velocities. Table 13 gives the maximum velocities Vm(km/sec), payload mass $M_p$(MT), total mass ratios $R_t$, magnetic acceleration time T(min), and the specific launch energy $E_p$/M for the above vehicle/transmitter combinations, where the magnetic acceleration $a_m$=1.5 g remains constant within the full power range of the transmitter. The maximum launch acceleration is assumed to be 2.0 g.

TABLE 14

Approximate Travel Times Between Earth and the Planets Corresponding to an Escape Velocity $V_\infty$ = 100 km/sec

| Planet | Travel Time (days) |
|---|---|
| Mercury | 10 |
| Venus | 5 |
| Mars | 10 |
| Jupiter | 65 |
| Saturn | 130 |
| Uranus | 275 |
| Neptune | 425 |
| Pluto | 500 |

The Table shows that by accelerating vehicles to very high velocities ($V_\infty \approx$100 km/sec), trips through the inner solar system, to Mercury, Venus and Mars, could be achieved with trip-times only a few days longer than those of transatlantic ocean liners. Although trips to Jupiter and Saturn would require a few months, these trip-times are comparable to summer cruises. Shorter trip-times to Uranus, Neptune and Pluto could be achieved by accelerating vehicles beyond the full power range of the transmitter to reach higher velocities.

TABLE 13

Maximum Escape Velocities $V_\infty$(km/sec), Total Mass Ratios $R_t$, Acceleration Time T(min), and Specific Launch Energies $E/M_p$(J/kg) of Magnetically Accelerated Vehicles With PayLoad $M_p$ Operating at Maximum Efficiency. ($a_m$ = 1.5 g)

| | $R_v$ = 25 m $M_p$ = 50 MT | | | | $R_v$ = 50 m $M_p$ = 150 MT | | | | $R_v$ = 100 m $M_p$ = 4,500 MT | | | |
|---|---|---|---|---|---|---|---|---|---|---|---|---|
| $R_t$ | $V_\infty$ | $R_t$ | T | $E/M_p$ | $V_\infty$ | $R_t$ | T | $E/M_p$ | $V_\infty$ | $R_t$ | T | $E/M_p$ |
| 500 | 8.57 | 1.63 | 13.56 | 4.95E10 | 15.55 | 1.63 | 19.31 | 2.40E11 | — | — | — | — |
| 1000 | 15.55 | 1.65 | 19.31 | 6.38E10 | 23.55 | 1.64 | 27.39 | 3.06E11 | — | — | — | — |
| 1500 | 20.01 | 1.67 | 23.70 | 7.39E10 | 29.28 | 1.66 | 33.58 | 3.54E11 | — | — | — | — |
| 2000 | 23.55 | 1.68 | 27.39 | 8.21E10 | 34.00 | 1.67 | 38.79 | 3.95E11 | 48.38 | 1.63 | 54.90 | 4.34E11 |
| 2500 | 26.58 | 1.69 | 30.64 | 8.94E10 | 38.12 | 1.68 | 43.38 | 4.31E11 | 54.14 | 1.64 | 61.40 | 4.75E11 |
| 3000 | 29.28 | 1.70 | 33.58 | 9.59E10 | 41.83 | 1.68 | 47.54 | 4.64E11 | 59.33 | 1.64 | 67.26 | 5.12E11 |
| 3500 | 31.73 | 1.71 | 36.28 | 1.02E11 | 45.22 | 1.69 | 51.35 | 4.94E11 | 64.10 | 1.65 | 72.66 | 5.46E11 |
| 4000 | 34.00 | 1.72 | 38.79 | 1.08E11 | 48.38 | 1.70 | 54.90 | 5.23E11 | 68.55 | 1.65 | 77.69 | 5.78E11 |
| 4500 | 36.13 | 1.73 | 41.15 | 1.13E11 | 51.34 | 1.71 | 58.24 | 5.50E11 | 72.71 | 1.65 | 82.41 | 6.09E11 |
| 5000 | 38.12 | 1.74 | 43.38 | 1.18E11 | 54.14 | 1.71 | 61.40 | 5.76E11 | 76.67 | 1.66 | 86.88 | 6.38E11 |

This Table shows that all of these vehicles will be capable of taking off from the earth's surface, accelerating to very high escape velocities for a voyage through the solar system and landing on another planet (or satellite thereof) with mass ratios that are lower than that of long range commercial airliners. In the case of the 200 m diameter vehicle carrying several thousand passengers accelerated by a 10 km diameter transmitter, escape velocities exceeding 76 km/sec will be possible with a specific launch energy of 6.38×10$^{11}$ J/kg. Omitting the cost of food and the deceleration energy cost, the passenger cost for the voyage would be about $1,770. This is equivalent to the cost of a transatlantic flight on a Concord SST airliner.

If the vehicles are accelerated at 2.0 g and/or the diameter of the transmitter is increased, it will be possible to achieve escape velocities exceeding 100 km/sec. Table 14 is a list of approximate travel times that could be achieved by accelerating the vehicles to escape velocities of 100 km/sec.

Since the electrical energy used to generate the traveling magnetic fields could be obtained very inexpensively by nuclear-electric closed-cycle MHD generators (or by the Applicant's closed-cycle cryogenic engines described in my U.S. Pat. No. 5,040,373), it will be possible to operate these vehicles at a cost below that of large ocean-going luxury liners. Consequently, since the trip-times would approximate ocean voyages with comparable fares, this propulsion concept would make large-scale commercial interplanetary space travel possible. And this would open the entire solar system to colonization.

I would like to make some concluding remarks in setting forth the present propulsion system in order to clearly distinguish it from all prior art propulsion systems designed for space travel.

First and foremost, the fundamental problem of finding a propulsion method (a propulsion concept) for achieving high-speed manned space travel required for commercial interplanetary flight through the solar system by ordinary individuals is presently believed to be far beyond any possible solution with current technology. Although it is possible to design vehicles propelled by advanced nuclear propulsion systems for achieving high-speed interplanetary space travel for the distant future, these vehicles could not be operated directly from the earth's surface because of inherently low thrust-to-weight ratios. The danger of contaminating large areas with radioactive debris resulting from a possible accident also excludes these vehicles from operating directly from the earth's surface. Consequently, even if such vehicles are developed in the distant future, they could only be operated between orbiting space stations, and their construction (in orbit) would be very expensive. Trips to the Moon and other celestial bodies would require the tedium of having to use three different transportation systems, each of which would be fairly expensive to operate, and would be limited to relatively small payloads. Several hundred passengers waiting in an orbiting space station to board a high-speed transfer vehicle for a flight to another space station orbiting the Moon or Mars would require very large and very expensive space stations.

This disclosure introduces a new propulsion concept that has the potential for circumventing the technical barriers to commercial interplanetary space travel by a wide margin. The concept is based on designing the vehicle in the form of a streamlined toroidal airfoil containing a thin-walled superconducting solenoid having the same mean radius, launching it vertically from the earth's surface to a low altitude vacuum environment with relatively little conventional rocket propulsion, and creating a traveling repulsive magnetic field behind the vehicle to accelerate it by magnetic repulsive forces. The traveling repulsive magnetic field is created by ejecting an easily ionizable, low-density gas cloud in the vehicle's magnetic field, and exciting it with a plane-polarized microwave beam tuned to the electron cyclotron resonate frequency transmitted from the earth's surface. The gas is ionized and the free electrons are pumped into high-energy resonant cyclotron orbits, which, in their aggregate, generate a very large repulsive magnetic field that travels behind the vehicle. By constructing the transmitter horizontally as a large multiple-feed, electronically-steered, phased array, energized by a system of superconducting energy storage coils, virtually unlimited power could be transmitted to achieve essentially any thrust-to-weight ratio desired. By utilizing very high microwave frequencies and focusing techniques, it will be possible to magnetically accelerate circular, coil-carrying vehicles over great distances to reach very high earth escape velocities with mass ratios close to the theoretical limit of 1.0. Since the acceleration trajectories have high inclinations, only one transmitter is required to accelerate the vehicle. The same transmitter could be used to decelerate a high-speed vehicle returning to earth.

An important feature of this propulsion concept is the fact that all of the required operating systems needed to construct it already exist. The performance possibilities of even relatively small systems (such as 50 m diameter vehicles and a one kilometer diameter transmitter) are quite significant. Such a system would be capable of transporting enormous amounts of payload to orbit, to the Moon, or to other celestial bodies at a cost approximately equal to the cost of the electrical energy used to generate the traveling repulsive magnetic field. Since it will be possible to use the propulsion system to eject radioactive waste products out of the solar system, the electrical energy could be generated by automated nuclear power plants (such as radiatively cooled Rosa type, closed-cycle, MHD generators) at very low cost. This would enable payloads to be transported at a cost comparable to that of transatlantic air cargo.

Since the propulsion system would enable large amounts of payload to be transported anywhere in the solar system at very low cost, it would be possible to use an initial earth-based system to transport cargo to construct superconducting storage coils and microwave transmitters on the Moon and on other celestial bodies. Since no onboard power generating system is required to magnetically accelerate the vehicles, they are able to operate directly between the surfaces of those celestial bodies equipped with these systems. One of the most remarkable features of this propulsion concept is the possibility that large vehicles could be launched directly from the earth's surface, accelerated onto an interplanetary trajectory through the solar system with an escape velocity of 100 km/sec, decelerated, and landed directly on the surface of another planet (or satellite thereof) with a total mass ratio lower than that of long-range commercial airliners.

The attainable velocities are so high that the flight times between the inner planets would be only a few days and comparable to that of voyages on transatlantic ocean liners. But the peak acceleration loads are very low (e.g., 1.5 g), and easily tolerated by ordinary passengers.

Since the injection velocities are so high, there is no need to accelerate the vehicles along the interplanetary trajectories. Thus, there is no need for the vehicles to carry any major energy generating system for primary propulsion other than that required for guidance (which could be provided by the chemical launch propulsion system). Consequently, the basic design of the vehicles is fairly simple, making it relatively easy to construct vehicles having diameters of several hundred meters containing toroidal passenger cabins to accommodate several thousand passengers. By rotating these cabins inside the vehicles, an earth-like, artificial-gravity environment can be created. This rotation also gives the vehicle gyroscopic spin stability which prevents the vehicle from flipping over due to magnetic torque.

If the electrical energy could be generated at a cost of $10^{-4}$/KW-HR (achievable with automated nuclear power plants) the cost of high-speed flights through the solar system would approximate that of long-range commercial airliners. Excess electrical energy not needed for propulsion could be sold to utility companies to generate additional revenue. It is conceivable that such revenue could far exceed the cost of operating the vehicles. The system would enable commercial interplanetary space travel to become a practical reality. And this could lead to the colonization of the solar system on a scale previously believed to be far beyond technical possibility.

From the foregoing description, it will thus be evident that the present invention provides a vastly improved method for propelling vehicles for achieving ultra high-speed travel between widely seperated cities and economical space travel. As various changes and modifications can be made in the above system and operating method without departing from the spirit or scope the invention, it is intended that all matter contained in the above description or shown in the accompanying drawings, should be interpreted as illustrative and not in a limiting sense.

What is claimed is:

1. An apparatus for generating propulsive thrust on a space vehicle moving above the atmosphere in a vacuum environment comprising:

superconducting coil means mounted on said vehicle for generating a primary magnetic field;

an ionizable gas stored in said vehicle;

means for passing said ionizable gas through a portion of said primary magnetic field generated by said coil means;

means for transmitting a microwave beam into said magnetic field with a frequency designed to produce electron cyclotron resonance with free electrons of said gas thereby creating a traveling secondary repulsive magnetic field behind said vehicle; and means for spinning a circular mass mounted inside said vehicle for generating angular momentum to prevent said superconducting coil means from flipping over by magnetic torque.

2. An apparatus as set forth in claim 1 further comprising:

circular wing-like airfoil means having a duct-like central region;

means for mounting said superconducting coil means inside said airfoil means; and means for ejecting said gas into said central region for creating said repulsive secondary magnetic field.

3. An apparatus as set forth in claim 2 further comprising rocket propulsion means mounted on said circular airfoil means for launching said airfoil means off the earth's surface into a vacuum environment prior to creating said secondary traveling repulsive magnetic field.

4. An apparatus as set forth in claim 2 further comprising means for mounting a payload inside said airfoil means such that said airfoil means and said propulsion generating apparatus comprises a toroidal space vehicle for accelerating said payload to high velocities.

5. An apparatus as set forth in claim 3 further comprising aerodynamic braking means mounted on said airfoil means for decelerating said airfoil means through the atmosphere prior to landing said airfoil means back on the earth's surface.

6. An apparatus as set forth in claim 1 wherein said means for transmitting said microwave beam comprises a phased array microwave transmitter located on the earth's surface.

7. An apparatus for accelerating a payload above the atmosphere in a vacuum environment comprising:

a circular torodial airfoil having a longitudinal axis and a duct-like central region extending along said longitudinal axis;

means for mounting said payload inside said airfoil;

a superconducting solenoid coil mounted co-axially inside said airfoil for generating a primary axial magnetic field inside said central region;

means for storing an ionizable gas inside said torodial airfoil;

means for passing said ionizable gas through said central region in the magnetic field of said solenoid coil;

means for transmitting a microwave beam into said primary magnetic field from the earth's surface with a frequency designed to produce electron cyclotron resonance with free electrons of said gas moving through said primary magnetic field for creating a secondary magnetic field that acts repulsively on said superconducting solenoid coil to generate magnetic propulsive thrust for accelerating said payload and;

means for spinning a circular mass mounted inside said torodial airfoil for generating angular momentum to prevent said superconducting solenoid coil from flipping over by magnetic torque.

8. An apparatus as set forth in claim 7 wherein said microwave beam is generated by an electronically-steered phased array constructed horizontally on the earth's surface with a diameter exceeding 100 m and energized by a superconducting energy storage system.

9. An apparatus as set forth in claim 7 further comprising rocket propulsion means mounted on said circular airfoil for launching said airfoil off the earth's surface into a vacuum environment prior to creating said secondary magnetic field.

10. An apparatus as set forth in claim 7 further comprising aerodynamic braking means mounted on said airfoil for decelerating said airfoil through the atmosphere prior to landing said airfoil back on the earth's surface.

11. A magnetic propulsion system for accelerating manned vehicles to high velocities above the atmosphere in a vacuum environment comprising:

a circular torodial airfoil having a longitudinal axis and a duct-like central region extending along said longitudinal axis;

torodial passenger cabin means mounted co-axially inside said airfoil;

superconducting coil means mounted co-axially inside said airfoil for generating a primary axial magnetic field inside said central region;

rocket propulsion means for launching said airfoil from the earth's surface to a vacuum environment above the atmosphere;

means for storing an ionizable gas inside said torodial airfoil;

means for passing said ionizable gas through said central region in the primary magnetic field of said superconducting coil means;

means for transmitting a microwave beam into said primary magnetic field from the earth's surface with a frequency designed to produce electron cyclotron resonance with free electrons of said gas moving through said primary magnetic field for creating a secondary magnetic field that acts repulsively on said superconducting coil means to generate magnetic propulsive thrust for accelerating said passenger carrying airfoil in a vacuum environment above the atmosphere; and means for spinning a circular mass mounted inside said circular torodial airfoil for generating angular momentum to Prevent said superconducting coil means from flipping over by magnetic torque.

12. An apparatus as set forth in claim 11 wherein said microwave beam is generated by an electronically-steered phased array constructed horizontally on the earth's surface with a diameter exceeding 100 m and energized by a superconducting energy storage system.

13. An apparatus as set forth in claim 11 further wherein said rocket propulsion means is mounted on said circular airfoil for launching said airfoil off the earth's surface into the vacuum environment prior to creating said secondary magnetic field.

14. An apparatus as set forth in claim 11 further comprising aerodynamic braking means mounted on said airfoil for decelerating said airfoil through the atmosphere prior to landing said airfoil back on the earth's surface.

15. An apparatus for generating a traveling repulsive magnetic field on a space vehicle moving above the atmosphere in a vacuum environment comprising:

superconducting coil means for generating a primary magnetic field; means for storing ionizable gas in said vehicle;

means for passing said ionizable gas through a portion of said magnetic field;

means for transmitting a microwave beam into a portion of said magnetic field with a frequency designed to produce electron cyclotron resonance with free electrons of said ionizable gas moving through said magnetic field thereby creating said traveling repulsive magnetic field; and means for spinning a circular mass mounted inside said vehicle for generating angular momentum to prevent said superconducting coil means from flipping over by magnetic torque.

16. A method for generating propulsive thrust above the atmosphere in a vacuum environment comprising the steps of:

charging a superconducting coil with electric current to generate a primary magnetic field;

storing an ionizable gas adjacent said superconducting coil;

passing said ionizable gas through a portion of said primary magnetic field;

transmitting a microwave beam into said primary magnetic field with a frequency designed to produce electron cyclotron resonance with free electrons of said gas; and spinning a circular mass for generating angular momentum to prevent said superconducting coil from flipping over by magnetic torque.

17. A method as set forth in claim 16 further comprising the steps of:

mounting said superconducting coil inside a circular wing-like airfoil means having a duct-like central region; and ejecting said ionizable gas into said central duct-like region for creating a repulsive secondary magnetic field by said microwave beam.

18. A method as set forth in claim 17 further comprising the step of propelling said airfoil means off the earth's surface into a vacuum environment prior to generating said repulsive magnetic field by rocket propulsion means mounted on said airfoil means.

19. A method as set forth in claim 16 wherein said step of transmitting said microwavebeam into said primary magnetic field comprises the steps of:

constructing a phased array microwave transmitter horizontally on the earth's surface; and energizing said phased array by a superconducting energy storage system.

20. A method for accelerating a body to high velocity above the atmosphere in a vacuum environment comprising the steps of:

charging a superconducting coil means with electric current so as to create a primary magnetic field;

mounting said superconducting coil means inside a circular wing-like airfoil means having a duct-like central region;

mounting said body in said airfoil means;

storing an ionizable gas in said airfoil means;

ejecting said ionizable gas into said central region;

transmitting a microwave beam into said primary magnetic field with a frequency designed to produce electron cyclotron resonance with free electrons of said gas to generate a secondary magnetic field that acts repulsively on said primary magnetic field thereby accelerating said airfoil means by magnetic repulsive forces; and spinning a circular mass mounted inside said airfoil means for generating angular momentum co prevent said superconducting coil means from flipping over by magnetic torque.

21. A method for generating magnetic propulsive thrust comprising the steps of:

charging a superconducting coil with electric current to generate a primary magnetic field;

injecting an ionizable gas in said magnetic field;

transmitting a microwave beam into said primary magnetic field with a frequency designed to produce electron cyclotron resonance with free electrons of said gas to generate a secondary magnetic field that acts repulsively on said primary magnetic field; and spinning a circular mass attached to said superconducting coil for generating angular momentum to prevent said coil from flipping over by magnetic torque.

* * * * *